US008842880B2

(12) United States Patent
Nakano et al.

(10) Patent No.: US 8,842,880 B2
(45) Date of Patent: Sep. 23, 2014

(54) INFORMATION PROCESSING APPARATUS, METHOD OF CONTROLLING INFORMATION PROCESSING APPARATUS, AND STORAGE MEDIUM

(75) Inventors: Shunsuke Nakano, Kawasaki (JP); Hiroshi Sato, Kawasaki (JP); Yuji Kaneda, Kawasaki (JP); Takashi Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 225 days.

(21) Appl. No.: 13/444,738

(22) Filed: Apr. 11, 2012

(65) Prior Publication Data

US 2012/0269389 A1 Oct. 25, 2012

(30) Foreign Application Priority Data

Apr. 20, 2011 (JP) ................................. 2011-094377

(51) Int. Cl.
*G06K 9/00* (2006.01)
*G06F 3/00* (2006.01)

(52) U.S. Cl.
CPC ................................. *G06K 9/00288* (2013.01)
USPC ............................ 382/103; 382/224; 715/716

(58) Field of Classification Search
CPC ............ G06K 9/00; H04N 5/225; G06F 3/00
USPC ......... 382/100, 103, 106–107, 118, 155, 162, 382/168, 173, 181, 189–199, 219, 232, 254, 382/274, 276, 287–291, 305, 312, 224; 715/716; 358/1.4
See application file for complete search history.

(56) References Cited

U.S. PATENT DOCUMENTS

| | | | |
|---|---|---|---|
| 6,463,176 B1 | 10/2002 | Matsugu et al. | |
| 6,795,092 B1* | 9/2004 | Nagai et al. | 715/716 |
| 6,907,140 B2 | 6/2005 | Matsugu et al. | |
| 6,982,811 B2* | 1/2006 | Sato | 358/1.4 |
| 7,054,850 B2 | 5/2006 | Matsugu | |
| 7,321,445 B2* | 1/2008 | Sato | 358/1.4 |

(Continued)

FOREIGN PATENT DOCUMENTS

| | | |
|---|---|---|
| JP | 11353485 A | 12/1999 |
| JP | 3078166 B2 | 8/2000 |
| JP | 2002008032 A | 1/2002 |
| JP | 2002163655 A | 6/2002 |

OTHER PUBLICATIONS

Viola et al., "Rapid Object Detection using a Boosted Cascade of Simple Features", Accepted Conference on Computer Vision and Pattern Recognition, 2001.
H. Wang et al., "Self quotient image for face recognition", Proc. of Intl. Conf. on Image Processing, vol. 2, 2004.

(Continued)

*Primary Examiner* — Seyed Azarian
(74) *Attorney, Agent, or Firm* — Fitzpatrick, Cella, Harper & Scinto

(57) ABSTRACT

An information processing apparatus comprising: an obtaining unit configured to obtain image data; a detection unit configured to detect an object from the image data; an attribute determination unit configured to determine an attribute indicating a characteristic of the object detected by the detection unit; a registration unit configured to register the image data in at least one of a plurality of dictionaries based on the attribute determined by the attribute determination unit; and an adding unit configured to add, when the image data is registered in not less than two dictionaries, link information concerning the image data registered in the other dictionary to the image data registered in one dictionary.

14 Claims, 13 Drawing Sheets

(56) References Cited

U.S. PATENT DOCUMENTS

| | | |
|---|---|---|
| 8,396,262 B2 * | 3/2013 | Aisaka et al. ............... 382/118 |
| 2002/0038294 A1 | 3/2002 | Matsugu |
| 2003/0044073 A1 | 3/2003 | Matsugu et al. |
| 2011/0158536 A1 * | 6/2011 | Nakano et al. ............... 382/190 |

OTHER PUBLICATIONS

Ajmal S. Mian et al., "Keypoint Detection and Local Feature Matching for Textured 3D Face Recognition", International Journal of Computer Vision, vol. 79, 2007.

Neeraj Kumar et al., "Attribute and Simile Classifiers for Face Verification", Proc. of Intl. Conf. of Computer Vision, vol. 2, 2009.

* cited by examiner

INFORMATION PROCESSING APPARATUS, METHOD OF CONTROLLING INFORMATION PROCESSING APPARATUS, AND STORAGE MEDIUM

BACKGROUND OF THE INVENTION

1. Field of the Invention

The present invention relates to an information processing apparatus which identifies a category to which input data belongs, a method of controlling the information processing apparatus, and a storage medium and, more particularly, to an information processing apparatus which increases the speed and accuracy of identification processing by dividing dictionary data in accordance with the attributes of data, a method of controlling the information processing apparatus, and a storage medium.

2. Description of the Related Art

There have been proposed techniques which identify to which category registered in advance an object expressed by input data belongs by comparing the input data with data registered in advance. A concrete example of this object identification is personal authentication using image data. This technique identifies a person by using a feature unique to the person, such as the face or fingerprint, and is called face authentication or fingerprint authentication. Categories in personal authentication include names and IDs which can specify individuals. In object identification including personal authentication, it is necessary to register in advance an image of an object to be identified as a registered image, together with a name and ID, before the execution of identification. This registration allows to actually execute identification. When an image of an object to be identified (to be referred to as an "input image" hereinafter) is input, the input image is compared with each of the images registered in advance. If there is a registered image matching the input image, a registered object corresponding to the registered image is output as an identification result. If there is no registered image matching the input image, information indicating the absence of the object is output. In the following description of this specification, to identify the category of an object is to determine an individual difference in object (for example, a difference in person). The term "object detection" is similar to the above term. Assume, however, that this term means to determine and detect individuals as those belonging to the same category without discriminating them (for example, to detect faces from images without discriminating individuals).

An application example of personal authentication is personal authentication for security use in managing entering and leaving a given building. In such personal authentication for security use, several thousand to several ten thousand persons may be registered. An increase in the number of registered images in object identification indicates an increase in the number of times of identification, which requires much time to perform identification processing. This is a serious problem when personal authentication must be completed within a given time.

With regard to the problem that the time required for identification processing increases, Japanese Patent Laid-Open Nos. 2002-163655 and 11-353485 have disclosed authentication techniques which speed up identification processing by limiting registered images to be used for the processing.

The technique disclosed in Japanese Patent Laid-Open No. 2002-163655 automatically collects attributes such as pressing forces concerning fingerprints registered in advance, and stores each registered image in any of plurality of divided dictionaries. Each of the divided dictionaries stores a collection of registered images having the same attribute. When collecting a fingerprint to be identified, this technique simultaneously and automatically collects an attribute such as a pressing force, and performs identification for only registered data included in a dictionary matching the attribute. That is, the technique performs attribute determination with respect to both registered images and an input image, and narrows down registered images as identification processing targets based on the determination result. This eliminates the need to perform identification for all the registered images, and hence can speed up the identification processing.

An advantage of the technique of identifying data having the same attribute by performing attribute determination is that it is possible to improve the identification accuracy. For example, it is difficult to perform identification using a captured face image of a face from the front and a captured face image of a face from the side because of a great difference in look. It is however easier to determine, by comparing face images of faces from the front or of faces from the side with each other, whether the persons are the same person rather than when comparing face images from the front and side with each other. It is therefore possible to improve the accuracy of identification by performing identification using face images of faces from the front or face images of faces from the side upon determining the orientation of each face as an attribute. In addition, using methods suitable for identification for faces from the front and for identification for faces from the side can further improve the identification accuracy.

Assume that in this specification, the determination of an attribute of an object means the determination of a characteristic of an object (for example, sex or age) different from a category difference (for example, a person difference).

According to the technique of narrowing down registered images as identification processing targets based on attribution determination results on registered images and an input image, as disclosed in Japanese Patent Laid-Open No. 2002-163655, an error in an attribute determination result makes it impossible to perform correct identification.

With regard to this problem, the following is an example of handling a male face having an androgynous look which is difficult to perform gender determination in a case in which face authentication is performed upon narrowing down dictionaries as registration processing targets and identification processing targets by automatically performing gender determination.

When registering a face to be registered, gender determination is performed for the face to store the registered image in a dictionary corresponding to males or females. When registering a male face having an androgynous look which is difficult to perform gender determination, it is unknown whether the face is determined as a male face and is correctly registered in a dictionary corresponding to males or the face is wrongly determined as a female face and registered in a wrong dictionary. In addition, when a face to be identified is input, this technique performs gender determination for the face, and identifies the registered images stored in a dictionary corresponding to males or females as identification processing targets. At this time, if a male face which is difficult to perform gender determination is input, it is unknown whether the face is determined as a male face and the corresponding dictionary is identified as the dictionary corresponding to males or the face is wrongly determined as a female face and the corresponding dictionary is wrongly identified as the dictionary corresponding to females. Such an attribution determination error at the time of registration or identification may even lead to inability to collate an input image with registered images of persons corresponding to the input image.

In addition, when a method for identification of male faces and a method for identification of female faces are those suitable for the respective purposes, another problem arises. If a male face having an androgynous look which is difficult to perform gender determination is wrongly determined as a female face and registered in a wrong dictionary, this technique may identify the wrongly determined male face by the method suitable for identification using females. Since the identification method needs to identify data which is not assumed to be identified by the method, sufficient identification accuracy may not be obtained.

In order to avoid this problem, a common identification method can be used instead of using different dictionaries for the respective attributes, register a face image in both dictionaries corresponding to males and females if an attribute determination result is unreliable at the time of registration, and perform identification processing for dictionaries corresponding to males and females if an attribute determination result is unreliable at the time of identification. Such a technique, however, cannot achieve an increase in the speed of identification processing and an improvement in identification accuracy, which are the primary objects of the technique.

SUMMARY OF THE INVENTION

In consideration of the above problems, the present invention provides a technique of suppressing a deterioration in identification performance even if an attribute determination result, which is a determination result on a characteristic of an object of an image, such as sex or age, differs from a correct answer.

According to one aspect of the present invention, there is provided an information processing apparatus comprising: an obtaining unit configured to obtain image data; a detection unit configured to detect an object from the image data; an attribute determination unit configured to determine an attribute indicating a characteristic of the object detected by the detection unit; a registration unit configured to register the image data in at least one of a plurality of dictionaries based on the attribute determined by the attribute determination unit; and an adding unit configured to add, when the image data is registered in not less than two dictionaries, link information concerning the image data registered in the other dictionary to the image data registered in one dictionary.

According to one aspect of the present invention, there is provided a method of controlling an information processing apparatus, the method comprising: obtaining image data; detecting an object from the image data; determining an attribute indicating a characteristic of the object detected in the detecting; registering the image data in at least one of a plurality of dictionaries based on the attribute determined in the determining an attribute; and adding, when the image data is registered in not less than two dictionaries, link information concerning the image data registered in the other dictionary to the image data registered in one dictionary.

Further features of the present invention will be apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

This embodiment will exemplify a face authentication technique of determining gender (sex) as an attribute indicating a characteristic of an object and identifying a personal difference as a category. The attribute to be determined is not limited to sex, and may be an arbitrary attribute that can be determined by humans and can classify identification targets into several categories, such as race or age. The purpose of the present invention is not limited to personal authentication. For example, it is possible to determine a vehicle type (sedan or hatchback) as an attribute and identify the model number of the vehicle as a category.

<Overall Arrangement>

Figure 1:
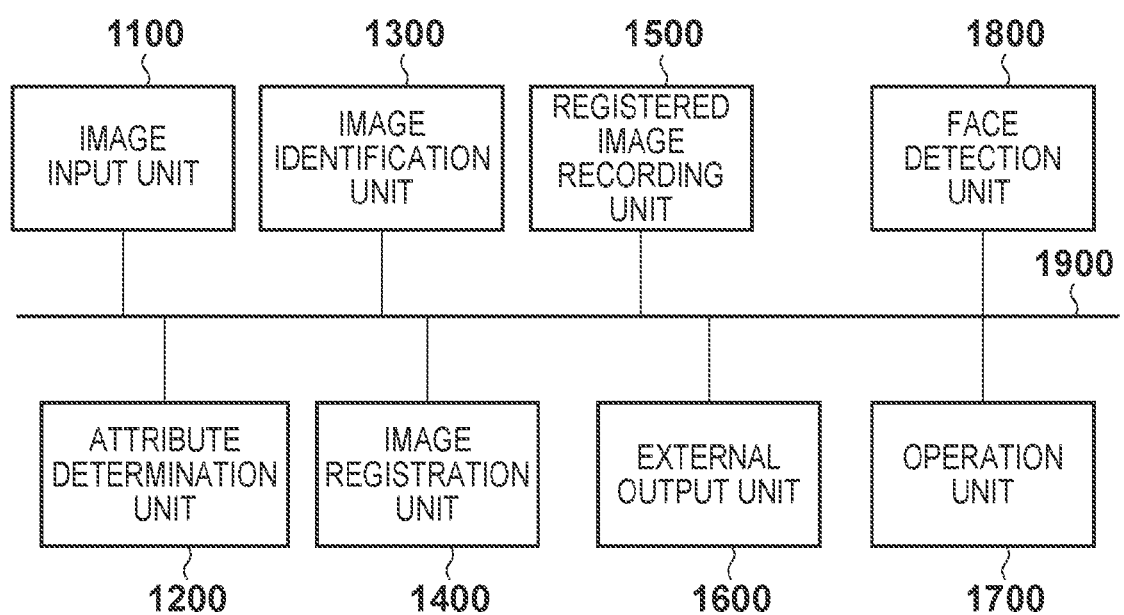
FIG. 1 is a block diagram of an object identification apparatus 1000 according to the first embodiment.

FIG. 1 shows the arrangement of an object identification apparatus 1000 (information processing apparatus 1000) which shows an embodiment to which the present invention can be applied. As shown in FIG. 1, the object identification apparatus 1000 includes an image input unit 1100, an attribute determination unit 1200, an image identification unit 1300, an image registration unit 1400, a registered image recording unit 1500, an external output unit 1600, an operation unit 1700, a face detection unit 1800, and a connection bus 1900.

The image input unit 1100 inputs images. The image input unit 1100 is not specifically limited as long as it is an apparatus which supplies image data to be identified. This apparatus may be an image capturing apparatus including an optical lens and an image sensor or a semiconductor memory which holds image data and allows data to be read out.

The attribute determination unit 1200 determines attributes of objects. The image identification unit 1300 identifies images. The image registration unit 1400 can register images.

The attribute determination unit 1200, the image identification unit 1300, and the image registration unit 1400 may be dedicated circuits (ASICs) or processors (reconfigurable processors, DSPs, CPUs, or the like). Alternatively, they may exist as programs to be executed in a single dedicated circuit and a general-purpose circuit (a CPU for a PC). The detailed arrangements of the attribute determination unit 1200, image identification unit 1300, and image registration unit 1400 will be described later.

The registered image recording unit 1500 is used as a dictionary which records and holds image data input as registered images by the image input unit 1100. The registered image recording unit 1500 is typically a semiconductor memory capable of repetitive rewriting. This memory may have a capacity sufficient to hold several ten frames or more of image data or may have a capacity to hold only information to be used by the image identification unit 1300. The registered image recording unit 1500 includes dictionaries equal in number to the attributes which can be determined by the attribute determination unit 1200 and respectively correspond the attributes. The registered image recording unit 1500 may be physically constituted by a plurality of storage media equal in number to the dictionaries. Alternatively, a plurality of dictionaries may be logically implemented on a single storage medium (for example, a storage area is divided into a plurality of directories on a file system).

The external output unit 1600 outputs the attribute determination result obtained by the attribute determination unit 1200 and the object identification result obtained by the image identification unit 1300 to the outside. At the time of image registration, the external output unit 1600 outputs a determination result of the attribute determination unit 1200. At the time of image identification, the external output unit 1600 outputs a category identification result corresponding to an input image. The external output unit 1600 is typically a monitor such as a CRT or TFT liquid crystal display, and displays the image data obtained from the image input unit 1100. The external output unit 1600 may superimpose and display an output from the attribute determination unit 1200 or the image identification unit 1300 on image data. In addition, these results may be output as electronic data to an external storage medium or may be printed on a paper medium. Note that the output method to be used is not limited to those described above, and a plurality of methods may be simultaneously used.

The operation unit 1700 is used to input an instruction to the object identification apparatus 1000, and is used to obtain a correct attribute corresponding to the attribute of the object determined by the attribute determination unit 1200. Typically, the operation unit 1700 is a keyboard or mouse, and may be constituted by a plurality of buttons prepared on the apparatus surface. This apparatus may take a touch panel form and be integrated with the external output unit 1600. Alternatively, it is possible to use a magnetic card or a camera which reads barcodes. The face detection unit 1800 performs face detection processing for the image obtained by the image input unit 1100. The connection bus 1900 performs control/data connection for each processing unit to be described above.

<Registration Procedure>

Figure 2:
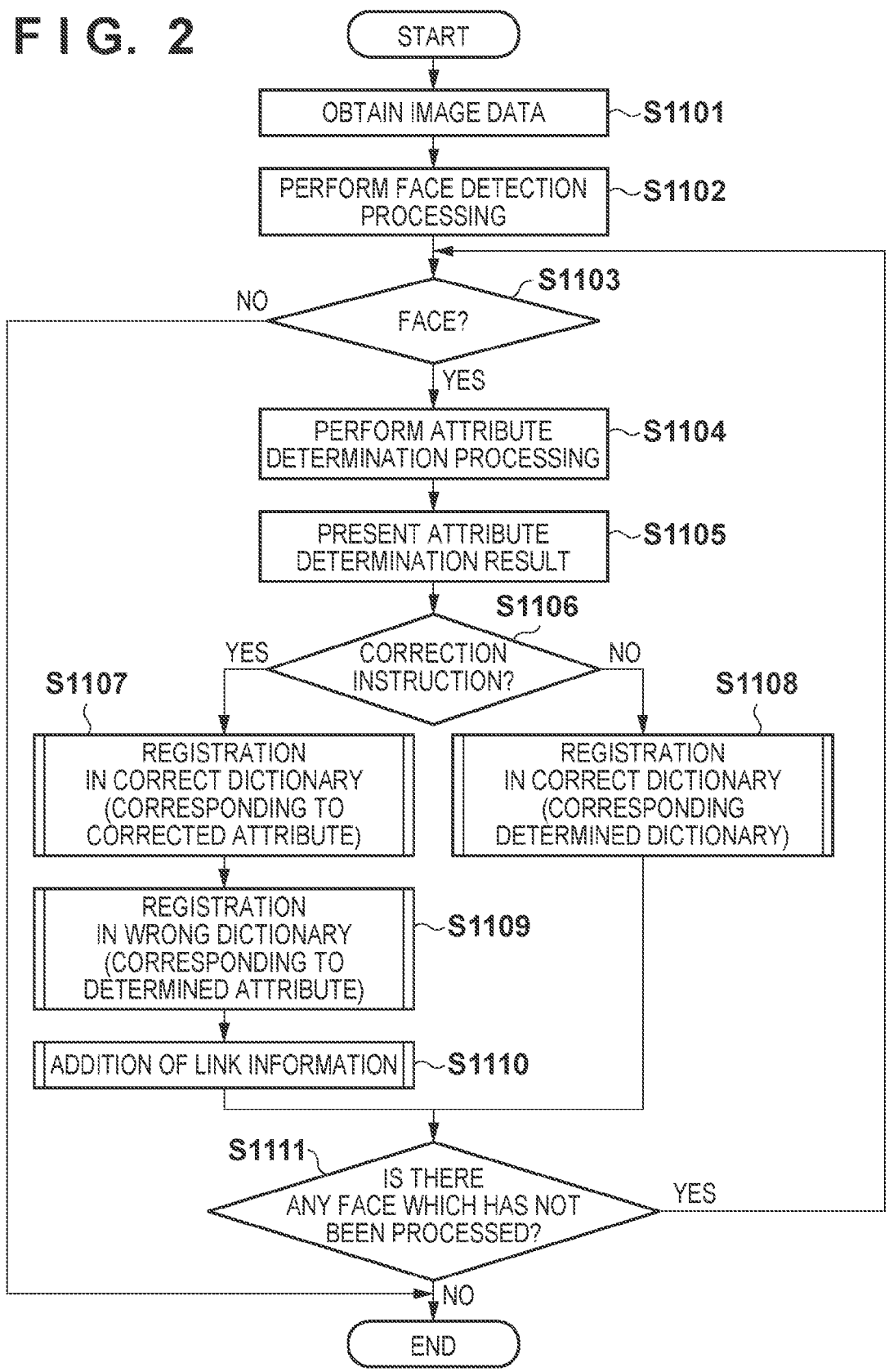
FIG. 2 is a flowchart showing a procedure for registration processing according to the first embodiment.

An example of a procedure for face image registration processing performed by the object identification apparatus 1000 in this embodiment will be described with reference to the flowchart of FIG. 2. In step S1101, the image input unit 1100 obtains an image to be registered.

In step S1102, the face detection unit 1800 performs face detection processing for the image obtained in step S1101. As a method of detecting the face of a person from an image, a known technique may be used. For example, it is possible to use a technique like that proposed in Japanese Patent No. 3078166 or Japanese Patent Laid-Open No. 2002-8032.

Upon detecting a face in step S1102, the face detection unit 1800 determines in step S1103 whether the face exists in the image. If the face detection unit 1800 determines that the face exists in the image (YES in step S1103), the process advances to step S1104. If the face detection unit 1800 determines that the face does not exist in the image (NO in step S1103), the apparatus terminates the processing.

In step S1104, the attribute determination unit 1200 performs attribute determination processing, that is, gender (sex) determination processing. In step S1105, the external output unit 1600 outputs an attribute determination result, and the operation unit 1700 accepts correcting operation by the operator, as needed.

The external output unit 1600 may present attribute determination results in all cases or may present a result in an inquiry form when the likelihood of attribute determination is low, instead of presenting results in all cases. This embodiment will exemplify a case in which the external output unit 1600 presents an attribute determination result to the operator and accepts a correction instruction with respect to the presented result. Another embodiment may be configured to accept information about a correct attribute of an image to be registered as a correct answer from the operator. For example, a given person to be registered inputs his/her own attribute via the operation unit 1700 simultaneously with image registration. As an input method, a given person inputs an attribute via a keyboard or inputs his/her own attribute by letting a magnetic card as an identification card be read. The processing procedure in step S1106 and the subsequent steps is the same in any case.

In step S1106, the operation unit 1700 determines whether it has accepted a correction instruction indicating that the attribute determination result is wrong (wrong attribute). If the operation unit 1700 determines that it has accepted a correction instruction (YES in step S1106), the process advances to step S1107. If the operation unit 1700 determines that it has not accepted any correction instruction (NO in step S1106), the process advances to step S1108.

In step S1107, the registered image recording unit 1500 registers the image in a dictionary corresponding to the correct attribute which has been corrected. In step S1108, the registered image recording unit 1500 regards that the attribute determination result is correct, because it has not accepted any correction instruction for the attribute determination presented by the external output unit 1600. The registered image recording unit 1500 then registers the image data (first image data) in a dictionary corresponding to the correct attribute as the determination result.

In step S1109, the registered image recording unit 1500 subsequently registers the image data (second image data) in a dictionary corresponding to a wrong attribute as a determination result as well. In step S1110, the registered image recording unit 1500 records the accepted correction instruction on the image registered in the dictionary corresponding to the wrong attribute as the determination result in step S1109.

In step S1111, the face detection unit 1800 determines whether there is any face which has not been processed yet in the accepted image. If the face detection unit 1800 determines that there is a face which has not been processed (YES in step S1111), the process returns to step S1103. If the face detection unit 1800 determines there is no face which has not been processed (NO in step S1111), the apparatus terminates the processing. Note that the processing in each of steps S1107, S1108, S1109, and S1110 will be described in detail later.

<Attribute Determination Processing>

The attribute determination processing in step S1104 in FIG. 2 will be described. Attribute determination processing is performed to compare the likelihood of the face being a male face with the likelihood of the face being a female face and output an attribute with a higher likelihood as a determination result. For attribute determination processing as well as for face detection, a known technique may be used. For example, it is possible to use Support Vector Machine (SVM) used to implement attribute determination in disclosed in Neeraj Kumar, 2009, "Attribute and Simile Classifiers for Face Verification", Proc. of Intl. Conference of Computer Vision. A detailed description of SVM will be omitted. When using SVM, the attribute determination unit 1200 typically calculates a numerical value called a likelihood. Attribute determination in this embodiment is binary classification of gender. In this case, a likelihood normalized within the range of [−1, +1]. Depending on whether this value is positive or negative, this technique determines an attribute. In the case of multi-class classification of race, the technique outputs likelihoods respectively corresponding to attributes which can be determined. It is possible to determine an attribute or attributes depending on whether a given attribute has the maximum likelihood or a plurality of attributes have likelihoods equal to or more than a threshold. This embodiment exemplifies binary classification of gender. The third embodiment will exemplify the case of multi-class classification.

<Image Registration Processing>

Figure 3:
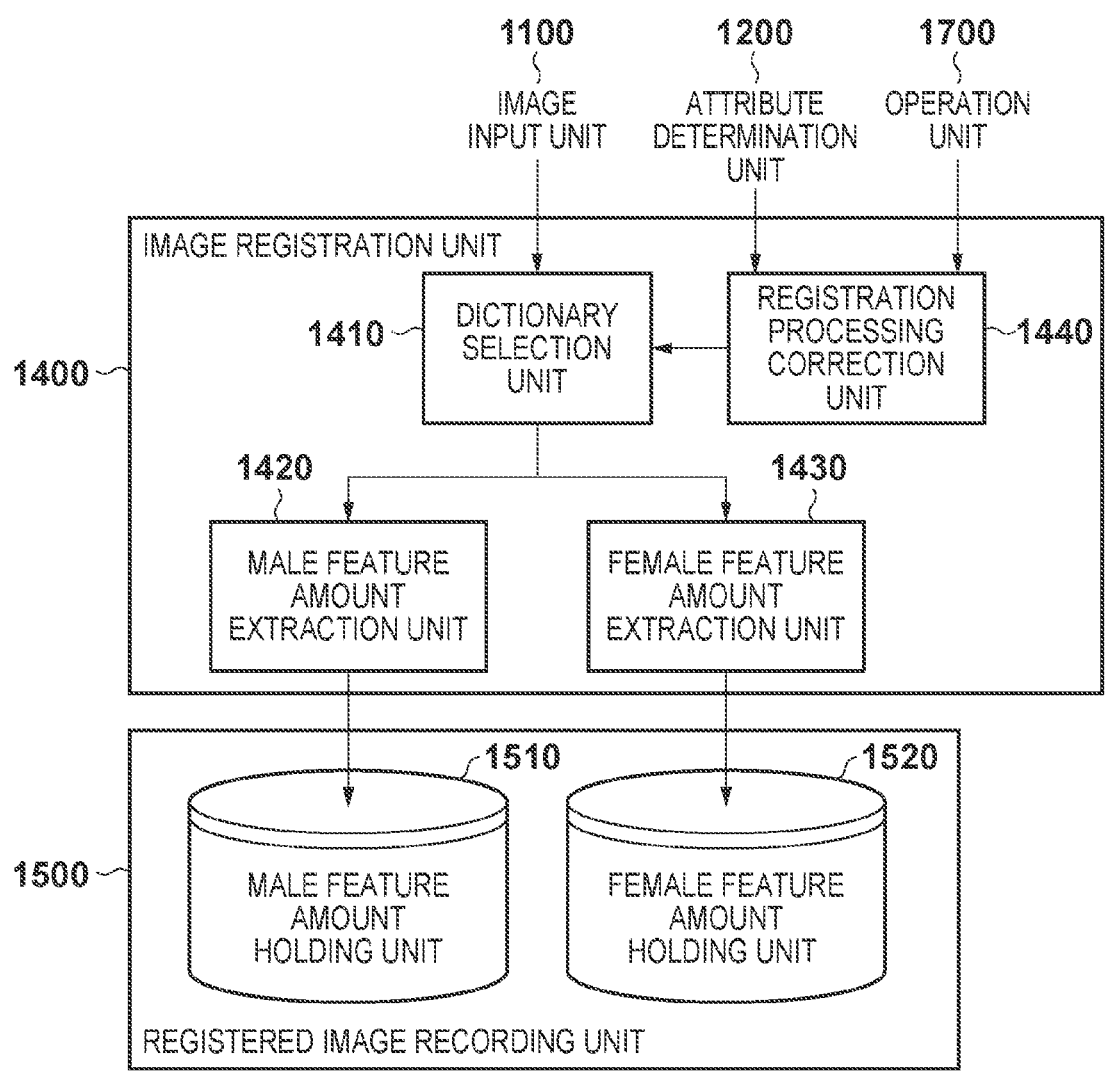
FIG. 3 is a block diagram of an image registration unit 1400 according to the first embodiment.

The processing in each of steps S1106 to S1110 in FIG. 2 will be described in detail below. FIG. 3 is a block diagram showing an example of the arrangements of the image registration unit 1400 and registered image recording unit 1500.

The image registration unit 1400 includes a dictionary selection unit 1410, a male feature amount extraction unit 1420, a female feature amount extraction unit 1430, and a registration processing correction unit 1440. The registered image recording unit 1500 includes a male feature amount holding unit 1510 and a female feature amount holding unit 1520. The registration processing correction unit 1440 presented here functions as an addition unit which adds link information.

The dictionary selection unit 1410 selects a dictionary in which a registered image is to be stored from the male feature amount holding unit 1510 or the female feature amount holding unit 1520. The dictionary selection unit 1410 then inputs the image to be registered to a feature amount extraction unit corresponding to the selected dictionary. When the image input unit 1100 inputs an image to be registered, the male feature amount extraction unit 1420 converts the image into a compressed feature amount and stores it together with the registered image and a name/ID in the male feature amount holding unit 1510. Likewise, when the image input unit 1100 inputs an image to be registered, the female feature amount extraction unit 1430 converts the image into a compressed feature amount and stores it together with the registered image and a name/ID in the female feature amount holding unit 1520. The following is a reason why this apparatus stores not only a registered image but also information obtained by converting the image. In general, face images include both variations in look from person to person and variations in look within the same person due to variations in illumination, facial expression, face orientation, and the like. Even when identifying images in this state, it is impossible to obtain sufficient identification accuracy due to variations in look within the same person which correspond to noise. For this reason, the apparatus extracts only variations in look from person to person, that is, feature amounts representing feature amounts representing individual differences, and uses them for the identification of face images. When storing registered images, the apparatus also stores feature amounts in advance to save the labor of performing feature extraction processing with respect to each registered image every time an image to be identified is input.

As a specific feature amount extraction method, a known method may be used. As preprocessing for feature amount extraction, there is available SQI (Self Quotient Image) conversion for the absorption of contrast differences on an overall image (see H. Wang, 2004, "Self quotient image for face recognition", Proc. of Intl., Conf. on Image Processing Vol. 2) or a method using only a partial region in which an individual feature appears as a feature amount (see Ajmal S. Mian 2008, "Keypoint Detection and Local Feature Matching for Textured 3D Face Recognition", International Journal of Computer Vision, vol. 79). Finally, the apparatus typically obtains, as a feature amount, a vector compressed to an information amount smaller than that of the image itself. This embodiment extracts a feature amount by using the following method as a specific example. First of all, the apparatus sets a predetermined number of partial regions with a predetermined shape and size on a face image, and cuts image portions from the regions. Partial regions to be cut are regions representing individual features, such as the eyes, mouth, and nose. The apparatus may cut partial regions from relative positions in the face regions determined by face detection described above. The apparatus then obtains, as a feature vector, an array of luminance values of the images in each of the cut partial regions. Although the number and size of partial regions to be cut from an image are arbitrarily determined, it suffices to set a total of several ten to several hundreds of partial regions on a region of the face which corresponds to about the half of the face width. When directly obtaining a luminance value (pixel value) as a feature vector, the feature amount greatly changes due to a slight change in illumination or the like. For this reason, such a feature amount may not be effective for identification. For this reason, a feature vector may be extracted from the result obtained by performing some kind of filter computation such as Gabor filter processing, SQI conversion, or DoG conversion for luminance values instead of being directly extracted from the luminance values. Predetermined conversion is further performed for the feature vector obtained from each partial region. This feature vector conversion is, for example, dimensional compression based on principal component analysis (PCA) or dimensional compression based on independent component analysis (ICA). When using PCA as a feature vector conversion method, there are parameters such as a base number (the number of dimension reduction of a feature vector) and information indicating which base is used. The sum of eigenvalues corresponding to a base vector, that is, a cumulative contribution ratio, may be used as a parameter index instead of a base number. It is possible to use different parameters or conversion methods for the respective partial regions. With the above processing, the apparatus obtains feature vectors extracted from a plurality of partial regions as feature amounts corresponding to one registered image.

Properly setting parameters such as the number, positions, and size of partial regions, and a base allows the male feature amount extraction unit 1420 and the female feature amount extraction unit 1430 to extract feature amounts more suitable for identification. As a typical example of optimization of feature extraction, the male feature amount extraction unit 1420 may extract feature vectors by setting many partial regions on a portion of the face which well represents an individual difference among males. Although parameters may be manually optimized, a feature of a face which well represents an individual difference may be learnt from many male face images prepared in advance by using a machine learning method like that disclosed in Viola & Jones 2001, "Rapid Object Detection using a Boosted Cascade of Simple Features", Computer Vision and Pattern Recognition. It is possible to improve the identification accuracy by extracting feature amounts from male images which allow to obtain a result that strongly indicates, when comparing the feature amounts, that the males are the same person when they are the same person, or strongly indicates that the males are different persons when they are different persons. Likewise, parameters for the extraction of feature amounts that allow to well identify females are obtained in advance for the female feature amount extraction unit 1430. Although FIG. 3 shows the male feature amount extraction unit 1420 and the female feature amount extraction unit 1430 as different blocks, it is not always necessary to separate them for the respective attribute determination results. If these units do not require different circuits and different program codes between two processes and differ in only parameters such as position and number, it is possible to integrate them into a common feature amount extraction unit. In this case, for example, a storage medium for holding parameters used for feature extraction for each attribute may be prepared separately.

The registration processing correction unit 1440 obtains an attribute determination result from the attribute determination unit 1200 and a correction instruction from the operation unit 1700, and controls the dictionary selection unit 1410 concerning which dictionary is to be selected. In addition, upon obtaining a correction instruction from the operation unit 1700, the registration processing correction unit 1440 adds link information to a dictionary corresponding to a wrong attribute, that is, a feature amount previously stored in a dictionary corresponding to an attribute determination result. The contents of the link information are that "the correct attribute of the person ∘∘ corresponding to this registered image is xx, and the registered image of the person ∘∘ is stored in the dictionary corresponding to the attribute xx". The registration processing correction unit 1440 drives a feature amount extraction unit corresponding to the correct attribute so as to store the registered image in the dictionary corresponding to the corrected correct attribute.

<Concrete Example of Image Registration Processing>

Figure 4:
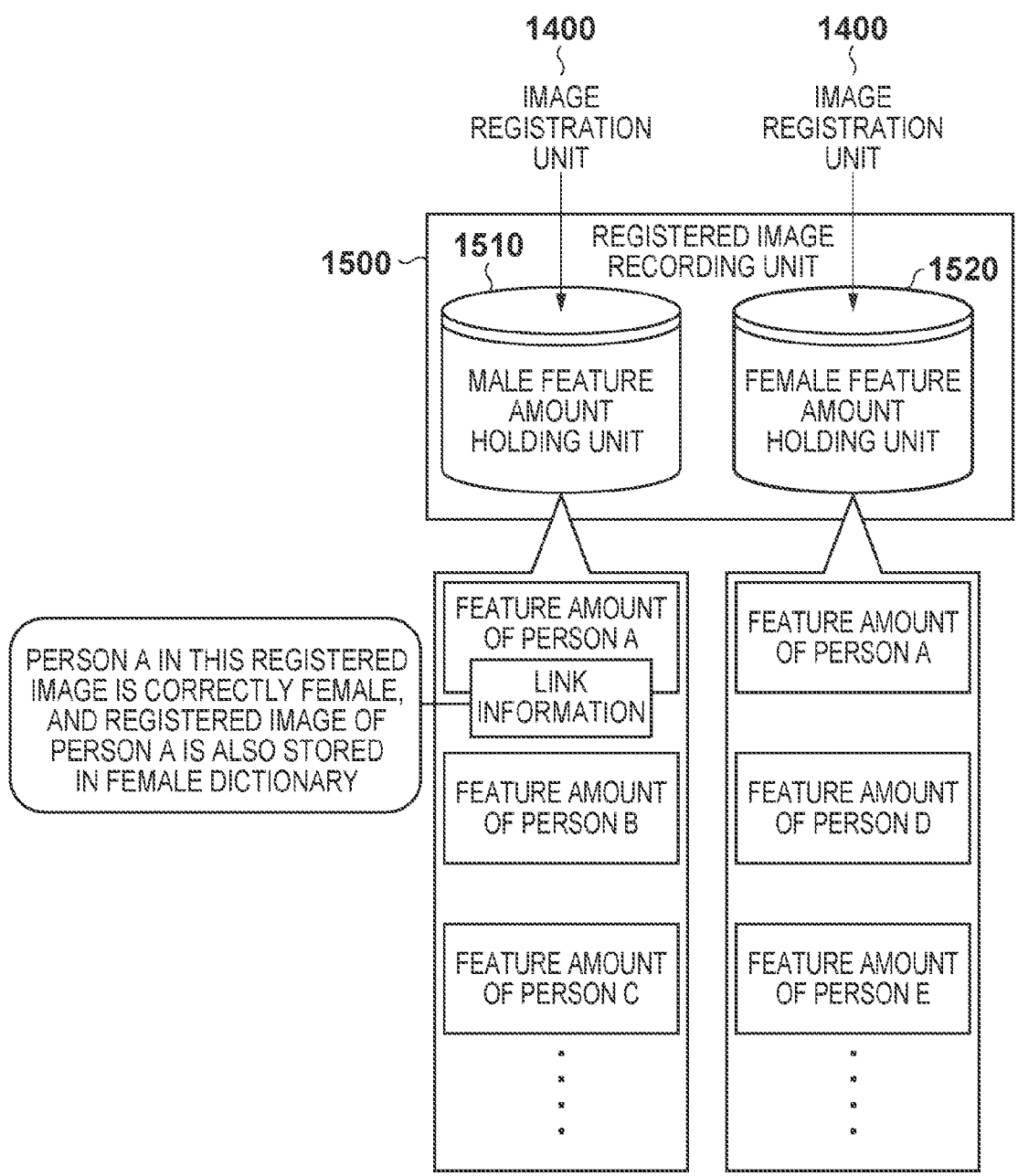
FIG. 4 is a view showing a concrete example of image registration processing according to the first embodiment.

This image registration processing will be described by exemplifying a concrete example with reference to the flowchart of FIG. 2. The following is a case in which the image input unit 1100 has input, as an image to be registered, an image of a female A having an androgynous look which is difficult to perform gender determination, and the attribute determination unit 1200 has wrongly determined that the gender is male. First of all, the external output unit 1600 presents an attribute determination result on the image of the person A (S1105). The apparatus then accepts a correction instruction indicating that the attribute of the female A is not male but is female via the operation unit 1700 (YES in step S1106). The registration processing correction unit 1440 selects a correct dictionary corresponding to the corrected attribute, that is, a dictionary corresponding to females, and the female feature amount extraction unit 1430 stores the feature amount and the registered image in the female feature amount holding unit 1520 (S1107). In addition, the male feature amount extraction unit 1420 stores the feature amount and the registered image in a wrong dictionary corresponding to the determined attribute, that is, a dictionary corresponding to males (S1109). Finally, the wireless communication unit 1440 adds link information to the registered image previously stored in the male feature amount holding unit 1510 (S1110). The contents of this information are that "the correct attribute of the person A corresponding to this registered image is female, and the registered image of the person A is stored in the dictionary corresponding to females (the female feature amount holding unit 1520). FIG. 4 shows the data which are finally stored in the respective dictionaries in the registered image recording unit 1500 with this series of processing. Referring to FIG. 4, the male feature amount holding unit 1510 records a feature amount of the person A, a feature amount of a person B, a feature amount of a person C, . . . . The female feature amount holding unit 1520 records a feature amount of the person A, a feature amount of a person D, a feature amount of a person E, . . . . The feature amount of the person A is recorded on both the male feature amount holding unit 1510 and the female feature amount holding unit 1520. Note however that link information is added to the feature amount of the person A recorded on the male feature amount holding unit 1510.

<Identification Procedure>

Figure 5:
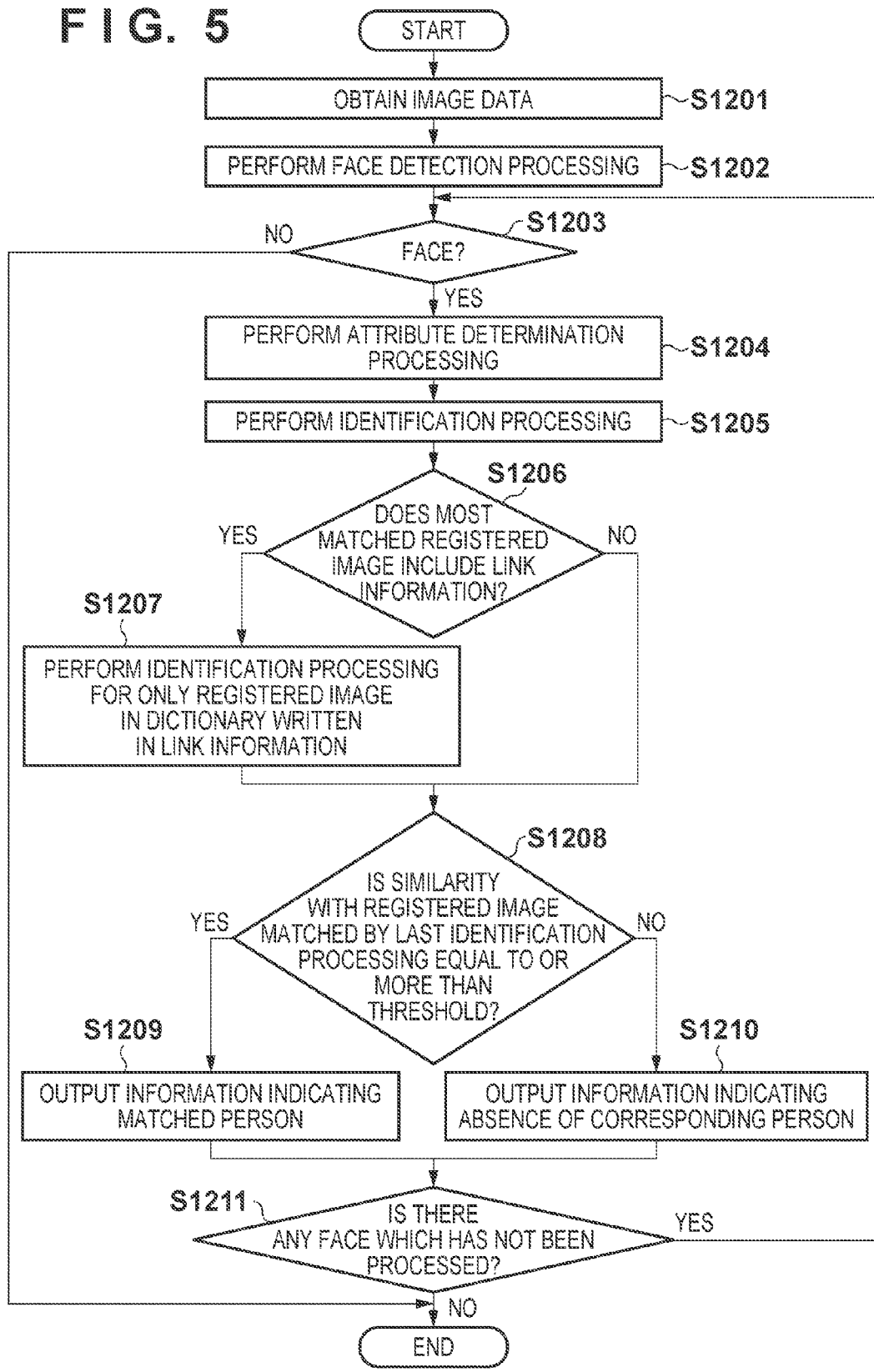
FIG. 5 is a flowchart showing a procedure for identification processing according to the first embodiment.

The flowchart of FIG. 5 shows an example of face image identification processing performed by the object identification apparatus 1000 in this embodiment.

In step S1201, the image input unit 1100 obtains an input image. In step S1202, the face detection unit 1800 subsequently performs face detection processing for the obtained image data. In step S1203, the face detection unit 1800 determines, based on the face detection processing result, whether any face exists in the image. If the face detection unit 1800 determines that a face exists in the image (YES in step S1203), the process advances to step S1204. If the face detection unit 1800 determines that no face exists in the image (NO in step S1203), the apparatus terminates the processing.

In step S1204, the attribute determination unit 1200 performs attribute determination processing, that is, gender (sex) determination processing. As face detection processing and attribute determination processing, the apparatus may use the same processing as the face detection processing (S1102) and the same processing as the attribute determination processing (S1104) which have been described above with reference to FIG. 2.

In step S1205, the image identification unit 1300 selects an image similar to an input image from a registered image included in a dictionary corresponding to the attribute determination processing (S1204) result by comparing the registered image with the input image. Although described in detail later, the image identification unit 1300 calculates a similarity representing the likelihood of a person in each registered image being the same person as that in the input image. The image identification unit 1300 compares these similarities to select a registered image exhibiting the highest similarity.

In step S1206, the image identification unit 1300 determines whether link information is added to the registered image exhibiting the highest similarity among the registered images. If the image identification unit 1300 determines that link information is added to the registered image (YES in step S1206), the process advances to step S1207. If the image identification unit 1300 determines that no link information is added (NO in step S1206), the process advances to step S1208.

In step S1207, the image identification unit 1300 performs identification processing with only the registered image of the same person which is included in a dictionary corresponding to the attribute after the correction indicated by the link information. The image identification unit 1300 redoes this identification processing regardless of the similarity between the input image and the registered image. The apparatus discards the initial identification result which has been a trigger to redo the identification processing.

In step S1208, the image identification unit 1300 compares a predetermined threshold with the similarity of a registered image (which corresponds to the registered image identified in step S1205 when identification is not redone) which is obtained as a result of redoing identification, and determines whether the similarity is equal to or more than the threshold (threshold determination processing). If the image identification unit 1300 determines that the similarity is equal to or more than the threshold (YES in step S1208), the process advances to step S1209. If the image identification unit 1300 determines that the similarity is lower than the threshold (NO in step S1208), the process advances to step S1210.

In step S1209, the external output unit 1600 outputs the name or ID of a person corresponding to the registered image as a category determination result. In step S1210, the external output unit 1600 outputs information indicating the absence of the corresponding person as a category determination result.

In step S1211, the face detection unit 1800 determines whether there is any face in the accepted image which has not been processed. If the face detection unit 1800 determines that there is a face which has not been processed (YES in step S1211), the process returns to step S1203. If the face detection unit 1800 determines that there is no face which has not been processed (NO in step S1211), the apparatus terminates the processing.

<Identification Processing>

Figure 6:
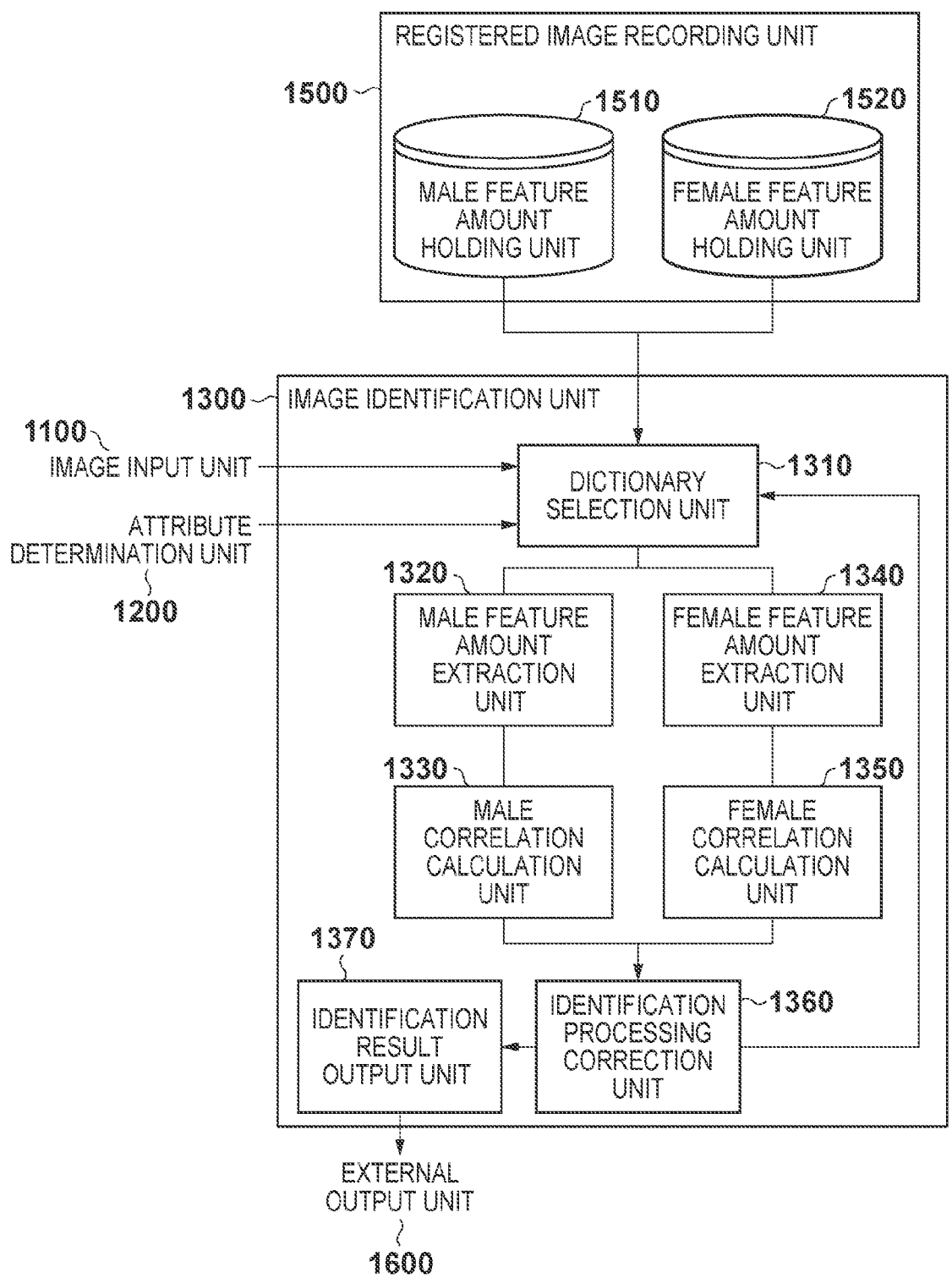
FIG. 6 is a block diagram of an image identification unit 1300 according to the first embodiment.

The processing in each of steps S1205 to S1207 in FIG. 5 will be described in detail below. FIG. 6 is a block diagram showing an example of the arrangements of the image identification unit 1300 and registered image recording unit 1500.

The image identification unit 1300 includes a dictionary selection unit 1310, a male feature amount extraction unit 1320, a male correlation calculation unit 1330, a female feature amount extraction unit 1340, a female correlation calculation unit 1350, an identification processing correction unit 1360, and an identification result output unit 1370. The registered image recording unit 1500 includes the male feature amount holding unit 1510 and the female feature amount holding unit 1520, and has the same arrangement as that shown in FIG. 3.

The dictionary selection unit 1310 obtains an input image to be identified from the image input unit 1100, and obtains an attribute determination result on the input image to be identified from the attribute determination unit 1200. The dictionary selection unit 1310 then selects one dictionary in which a registered image as an identification target exists from the male feature amount holding unit 1510 and the female feature amount holding unit 1520. The dictionary selection unit 1310 also selects one feature extraction/identification method for the input image from the male feature amount extraction unit 1320 and the female feature amount extraction unit 1340.

The male feature amount extraction unit 1320 or the female feature amount extraction unit 1340 converts the input image into a feature amount. The specific feature amount extraction method used in this case is the same as the extraction method in the male feature amount extraction unit 1420 or the female feature amount extraction unit 1430 shown in FIG. 3. This is because it is impossible to compare a registered image with an input image unless feature amounts are extracted by the same method as that used for them.

Subsequently, the male correlation calculation unit 1330 or the female correlation calculation unit 1350 compares the feature amount obtained from the input image with the feature amount of the registered image extracted from the selected dictionary. This processing makes it possible to obtain a similarity representing the likelihood of a person in each registered image being the same person as that in the input image. As a typical method of calculating a similarity, there is conceivable a method of calculating the distance or angle between feature vectors as a similarity. This embodiment obtains a plurality of feature vectors corresponding to a plurality of partial regions, set for one image, from the respective partial regions. The apparatus obtains similarities between the corresponding partial regions of each registered image and input image based on the corresponding feature vectors extracted from the corresponding partial regions, and calculates the average of the similarities between the plurality of partial regions as the similarity between one registered image and the input image. The apparatus then compares the similarity with a predetermined threshold to determine whether the person in the registered image is the same person as that in the input image. Note that the male correlation calculation unit 1330 and the female correlation calculation unit 1350 use different feature amounts for identification. This allows the male correlation calculation unit 1330 to identify a person among males more accurately, and the female correlation calculation unit 1350 to identify a person among females more accurately. Although FIG. 5 depicts the male correlation calculation unit 1330 and the female correlation calculation unit 1350 as different blocks, it is not always necessary to separate them for the respective attribute determination results. If these units do not require different circuits and different program codes between two processes and differ in only the number of feature vectors to be processed, the size of each vector, and the like, it is possible to integrate them into a common correlation calculation unit like the feature amount extraction units. In this case, for example, a storage medium for holding parameters required for similarity calculation for each attribute may be prepared separately. The male correlation calculation unit 1330 or the female correlation calculation unit 1350 obtains similarities concerning all the registered images, and finally inputs a registered image exhibiting the highest similarity and its similarity to the identification processing correction unit 1360.

The identification processing correction unit 1360 determines whether link information is added, which is added at the time of registration, to the registered image selected by the male correlation calculation unit 1330 or the female correlation calculation unit 1350. If the identification processing correction unit 1360 determines that no link information is added, the unit inputs the registered image and its similarity to the identification result output unit 1370 without performing any processing. If the identification processing correction unit 1360 determines that link information is added, the apparatus redoes identification with only the registered image (correct registered image) held in the correction dictionary written in the link information. The feature amount extraction unit corresponding to the correct dictionary extracts a feature amount of the input image again. The correlation calculation unit corresponding to the correct dictionary calculates the similarity between the input image and the correct registered image written in the link information. The correlation calculation unit then inputs the correct registered image and its similarity to the identification result output unit 1370.

The identification result output unit 1370 compares the input similarity of the registered image with a predetermined threshold. If the similarity is equal to or more than the threshold, the identification result output unit 1370 outputs information indicating the person corresponding to the input image is the same person as that corresponding to the registered image. If the similarity does not exceed the threshold, the identification result output unit 1370 outputs information indicating the absence of the corresponding person. Assume that this threshold is too low. In this case, even if a person who has not been registered is input, the apparatus determines that the input person corresponds to one of the registered persons. In contrast, assume that the threshold is too high. In this case, even if a person who has been registered is input, the apparatus determines that there is no corresponding person. Based on which error is more serious, a threshold needs to be adjusted before the operation of the apparatus.

According to the description of image registration processing, it is preferable to optimize feature amount extraction, that is, the identification method, in accordance with attributes. In this embodiment, typically, a high similarity is obtained especially when identifying the same male person using the identification method corresponding to males, whereas a low similarity is obtained especially when identifying a different person. The same applies to the case of females. Therefore, setting a higher threshold can reduce the possibility of outputting information indicating a wrong person. For example, in an exceptional case in which an identification method corresponding to males is used to identify the same female person, it is not clear whether an especially high similarity can be obtained. This is because no exceptional learning data when optimizing an identification method.

An effect of identification processing in the present invention is that the load of identification processing is small when an attribute determination result includes an error. According to a typical method other than the present invention, at the time of registration, when an attribute determination result on a given image is unreliable, the image is registered in a plurality of dictionaries. In addition, at the time of identification, when an attribute determination result on an input image is unreliable, identification is performed for all the registered images included in a plurality of dictionaries on which attribute determination can be done. This increases the number of registered images to be identified, resulting in a large load. In contrast to this, in the present invention, even if an attribute determination result is unreliable at the time of identification, when an attribute determination result happens to be correct, the load of identification is generally equivalent to one dictionary. Even if an attribute determination result happens to be wrong, the load of identification is equivalent to one dictionary+one person.

<Concrete Example of Identification Processing>

Identification processing up to this point will be described again, with reference to the flowchart of FIG. 5, by exemplifying the concrete example described with reference to FIG. 4 in the description of registration processing. In the example shown in FIG. 4, the person A, who is actually a female, is wrongly determined as a male, and the registered image is held in both the dictionaries corresponding to males and females. In addition, according to the above description, the link information shown in FIG. 4 is added to the registered image of the person A which exists in the dictionary corresponding to males.

A case in which the image of the person A has been given as an input image will be described. First of all, the attribute determination unit 1200 determines the sex of the person in the input image (S1204). At this time, as well as performing registration, the person may be wrongly determined as a male instead of a female. If the person is wrongly determined as a male, the male feature amount extraction unit 1320 extracts a feature amount from the input image. The male correlation calculation unit 1330 then identifies the input image and the registered images held in the male feature amount holding unit 1510, and obtains one registered image exhibiting the highest similarity (S1205). If this registered image corresponds to the person A and link information is added to the image (YES in step S1206), the apparatus identifies only the registered image of the person A held in the female feature amount holding unit 1520 and the input image. More specifically, the female feature amount extraction unit 1340 extracts a feature amount from the input image again. The female correlation calculation unit 1350 then compares the registered image of the person A held in the female feature amount holding unit 1520 with the input image, and inputs the registered image and the similarity to the identification result output unit 1370 (S1207). Finally, the identification result output unit 1370 compares the similarity of the registered image with a threshold. If the similarity is especially high and is equal to or more than the threshold (YES in step S1208), the identification result output unit 1370 outputs information indicating the corresponding person as the person A (S1209).

The following is another case in which an image of a male who resembles the person A but is a different person and has not been registered yet is input as an input image. First of all, the attribute determination unit 1200 determines the sex for the input image (S1204). If the attribute determination unit 1200 determines the person in the input image as a male, the male feature amount extraction unit 1320 extracts a feature amount from the input image. The male correlation calculation unit 1330 then compares the input image with the registered images held in the male feature amount holding unit 1510, and obtains one registered image exhibiting the highest similarity (S1205). Since the person in the input image resembles the person A, the selected registered image can be the image of the person A. If the registered image is that of the person A and link information is added to it (YES in step S1206), the apparatus compares the input image with only the registered image of the person A held in the female feature amount holding unit 1520. More specifically, as in the above case, the female feature amount extraction unit 1340 extracts a feature amount from the input image again. The female correlation calculation unit 1350 compares the input image with the registered image of the person A held in the female feature amount holding unit 1520, and inputs the registered image and its similarity to the identification result output unit 1370 (S1207). Finally, the identification result output unit 1370 compares the similarity of the registered image with a threshold (S1208). If the similarity is equal to or more than the threshold (YES in step S1208), the identification result output unit 1370 outputs information indicating that the person in the input image is the person A. Otherwise, the identification result output unit 1370 preferably outputs information indicating the absence of the corresponding person (S1210). If the female correlation calculation unit 1350 identifies the person A and the male resembling the person A, the unit cannot obtain an especially high similarity. That is, the obtained similarity is equal to or less than the threshold.

Second Embodiment

In the first embodiment, when registering an image, the apparatus externally receives a correction instruction as a correct answer of an attribute determination result on the image to be registered and adds link information to the image registered in the dictionary based on the instruction. In contrast to this, in the second embodiment, even when the apparatus cannot externally receive a correct answer of an attribute determination result, the apparatus evaluates the reliability of the attribute determination result, and automatically adds link information to the registered image.

<Overall Arrangement>

Figure 7:
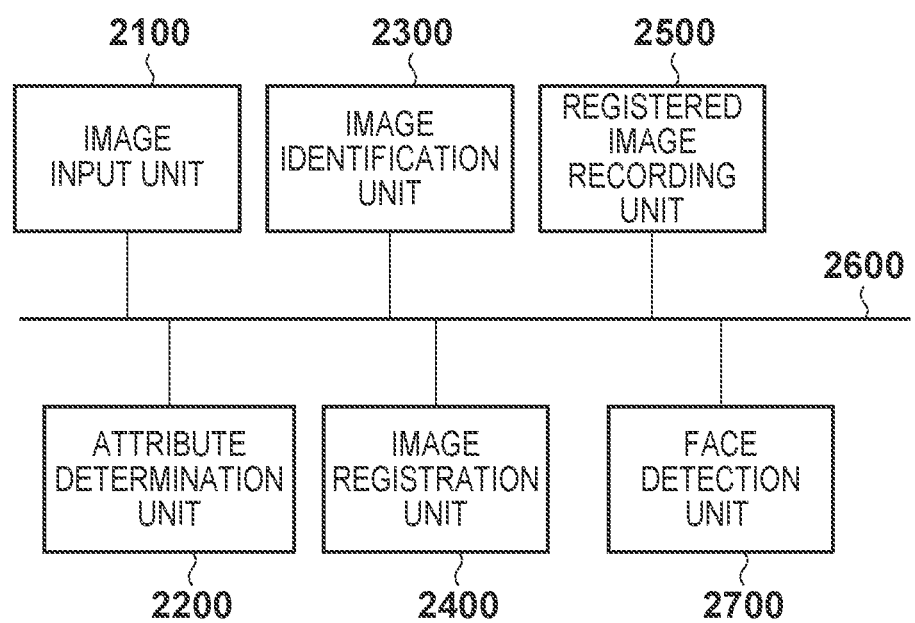
FIG. 7 is a block diagram of an object identification apparatus 2000 according to the second embodiment.

FIG. 7 is a block diagram showing the arrangement of an object identification apparatus 2000 according to an embodiment to which the present invention can be applied. As shown in FIG. 7, the object identification apparatus 2000 includes an image input unit 2100, an attribute determination unit 2200, an image identification unit 2300, an image registration unit 2400, a registered image recording unit 2500, a connection bus 2600, and a face detection unit 2700. The image input unit 2100 inputs images.

The attribute determination unit 2200 determines attributes of objects. The image identification unit 2300 identifies images. The image registration unit 2400 registers images. The registered image recording unit 2500 holds registered images. The connection bus 2600 performs control/data connection for the respective constituent elements. The face detection unit 2700 detects a face from the image input by the image input unit 2100. The second embodiment differs from the first embodiment in that it does not include the external output unit which outputs an object identification result and an attribute determination result and the operation unit which inputs an instruction to the object identification apparatus 2000.

<Registration Procedure>

Figure 8:
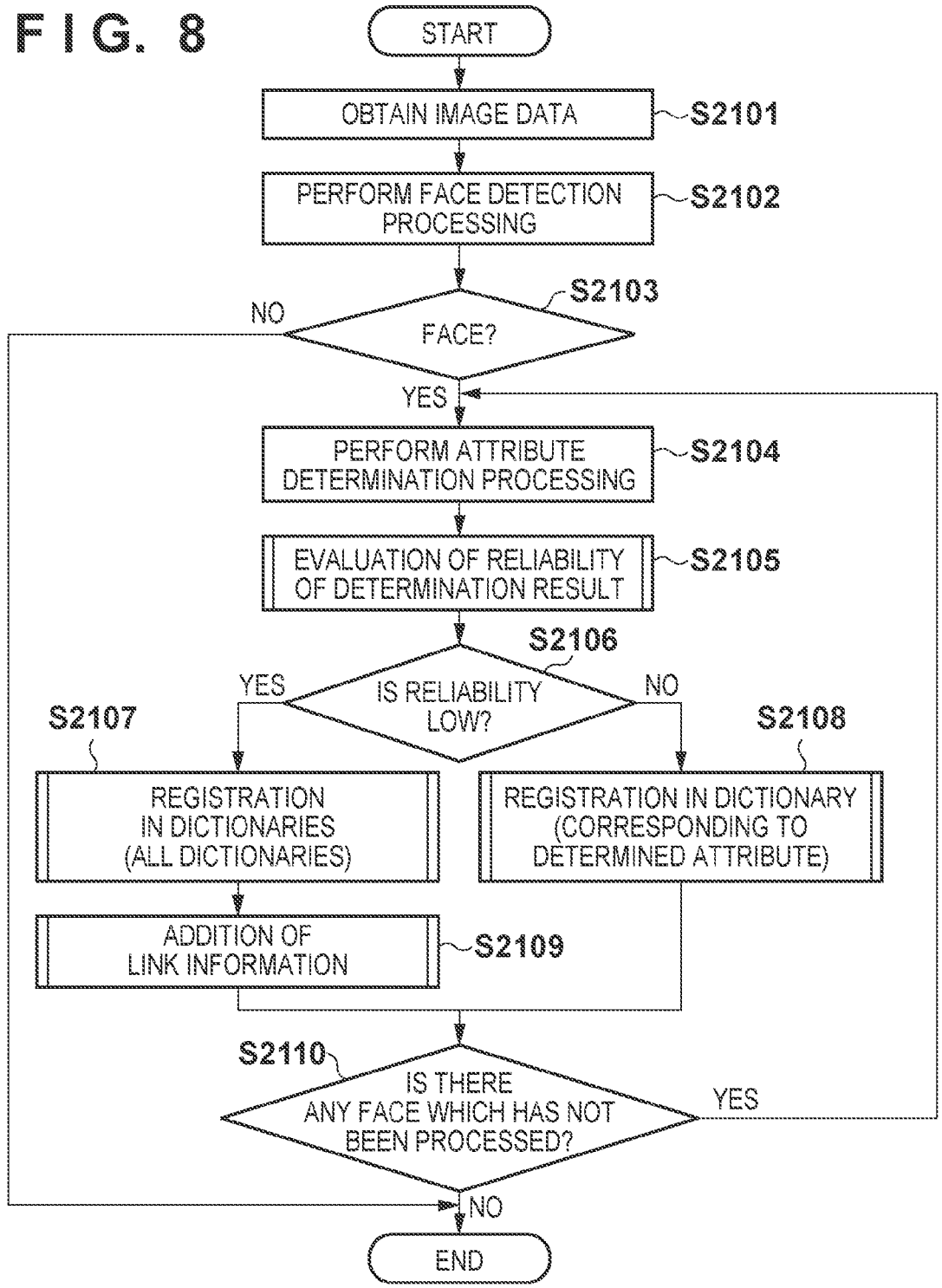
FIG. 8 is a flowchart showing a procedure for registration processing according to the second embodiment.

FIG. 8 shows an example of face image registration processing performed by the object identification apparatus 2000 in this embodiment. Actual face image registration processing performed by the object identification apparatus 2000 will be described with reference to FIG. 8. This embodiment differs from the first embodiment in processing after attribute determination processing (S2104).

First of all, in step S2101, the image input unit 2100 obtains an image to be registered. In step S2102, the face detection unit 2700 performs face detection processing for the image obtained in step S2101. Upon detecting a face in step S2102, the face detection unit 2700 determines in step S2103 whether any face exists in the image. If the face detection unit 2700 determines that a face exists in the image (YES in step S2103), the process advances to step S2104. In contrast, if the face detection unit 2700 determines that no face exists in the image (NO in step S2103), the apparatus terminates the processing.

In step S2104, the attribute determination unit 2200 performs attribute determination processing, that is, gender (sex) determination processing. In step S2105, the image registration unit 2400 evaluates and determines whether the attribute determination result on the image to be registered is reliable. The evaluation method in this case will be described in detail later. If the image registration unit 2400 determines that the attribute determination result is reliable (NO in step S2106), the process advances to step S2108. If the image registration unit 2400 determines that the attribute determination result is unreliable (YES in step S2106), the process advances to step S2107.

In step S2107, the registered image recording unit 2500 registers the image in all dictionaries. In step S2108, the registered image recording unit 2500 registers the image in a dictionary corresponding to the determined attribute. In step S2109, the registered image recording unit 2500 adds a correction instruction to each of the images registered in all the dictionaries. Correction instruction addition processing in this case will be described in detail later.

In step S2110, the face detection unit 2700 determines whether the accepted image includes any face which has not been processed yet. If the face detection unit 2700 determines that there is a face which has not been processed (YES in step S2110), the process returns to step S2104. If the face detection unit 2700 determines that there is no face which has not been processed (NO in step S2110), the apparatus terminates the processing.

<Image Registration Processing>

Figure 9:
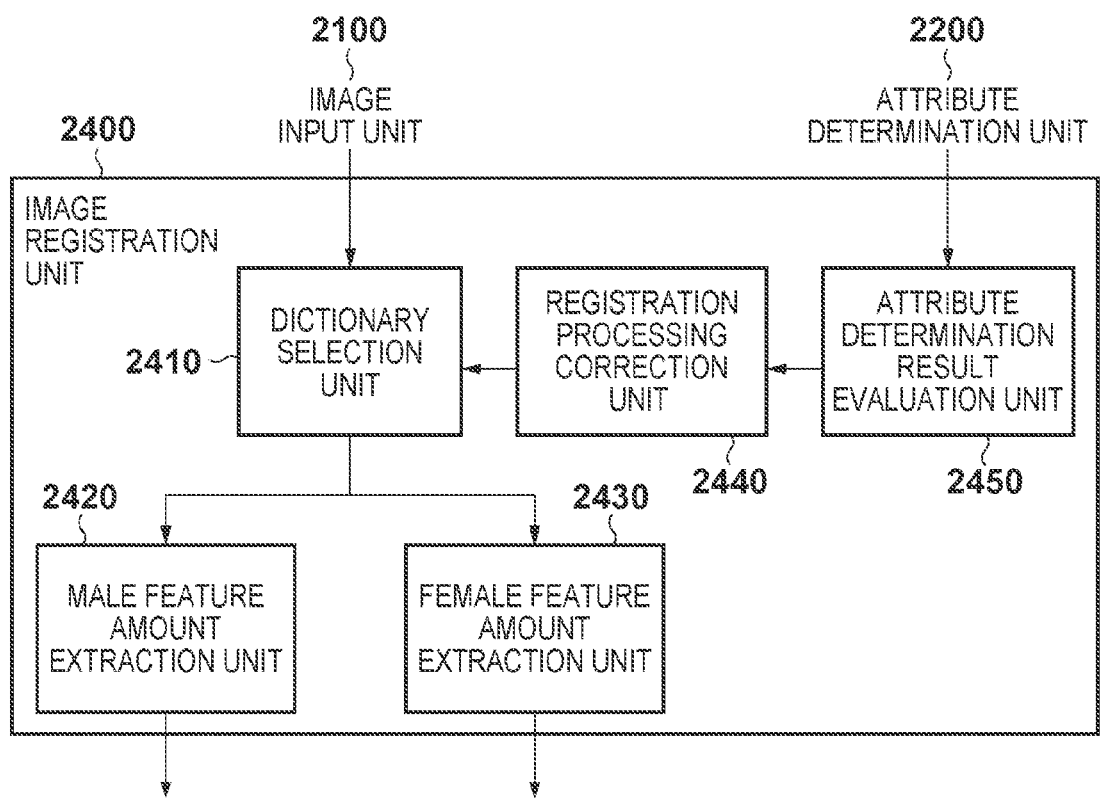
FIG. 9 is a block diagram of an image registration unit 2400 according to the second embodiment.

The processing in each of steps S2104 to S2109 in FIG. 8 will be described in detail below. FIG. 9 is a block diagram showing an example of the arrangement of the image registration unit 2400. The image registration unit 2400 includes a dictionary selection unit 2410, a male feature amount extraction unit 2420, a female feature amount extraction unit 2430, a registration processing correction unit 2440, and an attribute determination result evaluation unit 2450. This arrangement differs from that shown in FIG. 3 in the first embodiment in that it does not cause the registration processing correction unit 2440 to issue any correction instruction with respect to an externally obtained attribute determination result, and newly includes the attribute determination result evaluation unit 2450.

The attribute determination result evaluation unit 2450 determines whether the attribute belonging to the image to be registered which is obtained by the attribute determination unit 2200 is reliable or unreliable. That the attribute is unreliable indicates that the attribute determination result may be wrong. As a typical method of evaluating an attribute determination result, it is preferable to check a numerical value output as an attribute determination result. The attribute determination unit 1200 in the first embodiment performs binary classification of images. In this case, the attribute determination unit 1200 outputs a likelihood normalized within the range of [−1, +1] based on pixel values. In this case, if the likelihood falls within a range near 0 set in advance, the apparatus can determine that the reliability of the attribute determination result is low and the attribute can be determined as either of the attributes. In another case, when the attribute determination unit 1200 is configured to perform multi-class classification of an image, the unit outputs a likelihood corresponding to each of attributes which can be determined. In this case, if the highest likelihood is equal to or less than a predetermined threshold and there is another likelihood similar to it, it is possible to determine that the reliability of the attribute determination result is low. In addition, it is possible to determine that the attribute whose likelihood is similar to the highest likelihood is an attribute that can be wrongly determined.

The registration processing correction unit 2440 controls the registration method based on the evaluation value obtained by the attribute determination result evaluation unit 2450. If the attribute determination result evaluation unit 2450 determines that the attribute determination result on the image to be registered is unreliable, the registration processing correction unit 2440 registers the image in all the dictionaries. In addition, link information is added to the image registered in each dictionary. The link information indicates the images registered in all the other dictionaries. This makes the images registered in the respective dictionaries indicate each other. The link information is added with respect to the feature amount previously stored in a dictionary corresponding to the wrong attribute, that is, a dictionary corresponding to the attribute determination result. The contents of the link information are that "the attribute of the person ○○ corresponding to this registered image can be xx or ΔΔ, and the registered image of the person ○○ is stored in the dictionaries corresponding to the attributes xx and ΔΔ".

<Concrete Example of Image Registration Processing>

This image registration processing will be described by exemplifying a concrete example with reference to the flowchart of FIG. 8. The following is a case in which the image input unit 2100 has input an image of a person A having an androgynous look which is difficult to perform gender determination, and the reliability of the determination result obtained by the attribute determination unit 2200 is low. First of all, the attribute determination result evaluation unit 2450 obtains an evaluation indicating that the attribute determination result on the image of the person A is unreliable (NO in step S2106). The registration processing correction unit 2440 drives feature amount extraction units corresponding to all attributes for males and females to store the feature amount and the registered image in the feature amount holding units (S2107). In addition, link information described below is added to the registered image of the person A registered in a dictionary corresponding to males. The contents of the link information are that "the attribute of the person A corresponding to this registered image can be female, and the registered image of the person A is stored in the dictionary corresponding to females (a female feature amount holding unit 2520)" (S2109). At the same time, the following link information is added to the registered image of the person A registered in the dictionary corresponding to females. The contents of the link information are that "the attribute of the person A corresponding to this registered image can be male, and the registered image of the person A is stored in the dictionary corresponding to males (a male feature amount holding unit 2510)" (S2109).

<Identification Procedure>

Figure 10:
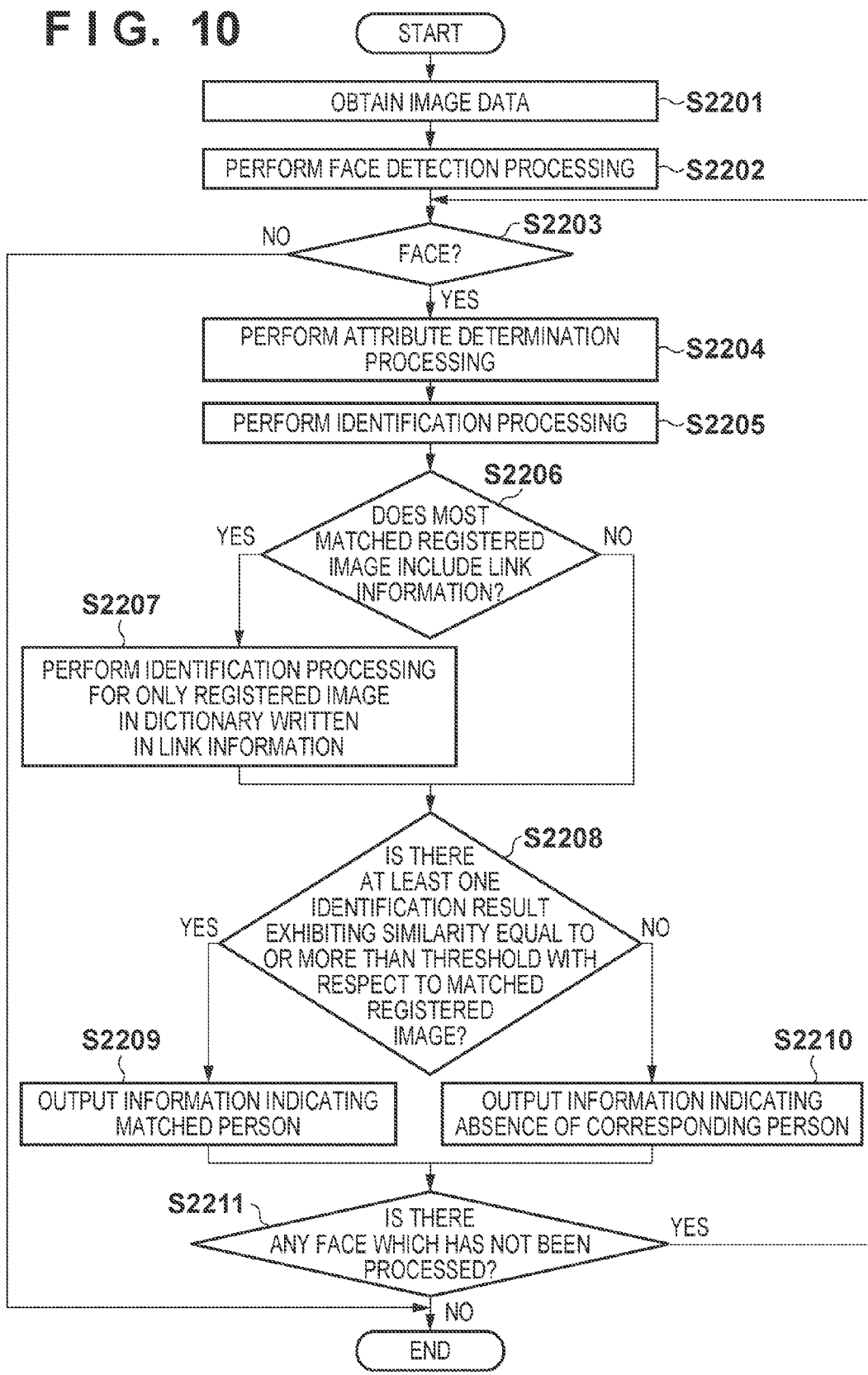
FIG. 10 is a flowchart showing a procedure for identification processing according to the second embodiment.

FIG. 10 shows an example of face image identification processing performed by the object identification apparatus 2000 in this embodiment. This processing differs from that shown in FIG. 5 in the first embodiment in the processing in step S2208. In the first embodiment, upon redoing identification based on link information, the apparatus discards the initial identification result, and determines the presence/absence of the corresponding person based on the final identification result. The apparatus obtains this determination result as the final output from the object identification apparatus 2000. In the second embodiment, upon redoing identification based on link information, when at least one identification result of the initial identification result and redone identification results indicates that the similarity of the registered image is equal to or more than a threshold, the apparatus outputs information indicating the presence of the corresponding person. This is because, since no correct attribute of a registered image is provided, there is no information for deciding whether to give priority to the identification result before or after redoing of identification.

In step S2201, an image input unit 1100 obtains an input image. In step S2202, the face detection unit 2700 performs face detection processing for the obtained image data.

In step S2203, the face detection unit 2700 determines, based on the face detection result, whether any face exists in the image. If the face detection unit 2700 determines that a face exists in the image (YES in step S2203), the process advances to step S2204. If the face detection unit 2700 determines that no face exists in the image (NO in step S2203), the apparatus terminates the processing. In step S2204, the attribute determination unit 2200 performs attribute determination processing, that is, gender (sex) determination processing.

In step S2205, the image identification unit 2300 subsequently compares the input image with the registered images included in a dictionary corresponding to the attribute determination processing (S2204) result to select an image similar to the input image from the registered image data. More specifically, the image identification unit 2300 performs similarity calculation processing.

In step S2206, the image identification unit 2300 determines whether link information is added to data, of the registered image data, which exhibits the highest similarity with the input image. If the image identification unit 2300 determines that link information is added (YES in step S2206), the process advances to step S2207. If the image identification unit 2300 determines that no link information is added (NO in step S2206), the process advances to step S2208.

In step S2207, the image identification unit 2300 performs identification processing with only the registered image of the same person at the link destination which is included in a dictionary corresponding to the attribute after correction written in the link information. The image identification unit 2300 redoes this identification processing regardless of the similarity between the input image and the registered image.

Upon redoing identification based on the link information, the image identification unit 2300 determines in step S2208 whether the similarity of the registered image is equal to or more than a threshold in at least one identification result of the initial identification result and the redone identification result (threshold determination processing). If there is no link information and identification is not redone, the image identification unit 2300 determines whether the similarity of the registered image is equal to or more than the threshold in only the initial identification result.

If there are one or more identification results in which the similarities of the registered images are equal to or more than the threshold (YES in step S2208), the process advances to step S2209. If the image identification unit 2300 determines there is no identification result in which the similarity of the registered image is equal to or more than the threshold (NO in step S2208), the process advances to step S2210.

In step S2209, an external output unit 1600 outputs the name or ID of the person corresponding to the registered image as a category determination result. In step S2210, the external output unit 1600 outputs information indicating the absence of the corresponding person as a category determination result.

In step S2211, the face detection unit 2700 determines whether the accepted images include any face which has not been processed yet. If the face detection unit 2700 determines that there is a face which has not been processed (YES in step S2211), the process returns to step S2203. If the face detection unit 2700 determines that there is no face which has not been processed (NO in step S2211), the apparatus terminates the processing. This embodiment is effective when no correct answer can be obtained with respect to an attribute determination result. If the reliability of an attribute determination result on an image to be registered is low, registering the image in all the dictionaries can avoid the problem of inability to perform identification because of different dictionaries, regardless of the attribute determination result at the time of identification. In addition, since this apparatus performs identification again with a small number of registered images based on link information, it is possible to avoid the load of performing identification again with all the registered images registered in all the dictionaries.

Third Embodiment

In the first embodiment, when registering/identifying images, the apparatus performs attribute determination processing once to classify the images into two categories, namely male and female. The third embodiment differs from the first embodiment in that it classifies images into a plurality of categories by combining a plurality of types of attribute determination processes. This embodiment will concretely exemplify a case in which the apparatus determines an age group (adult/child) in addition to gender as attributes, and performs face authentication of identifying a person difference as a category.

<Attribute Determination Processing>

Figure 11:
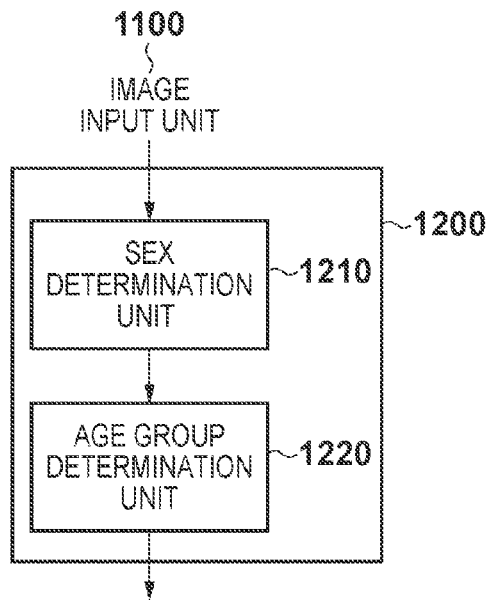
FIG. 11 is a block diagram of an attribute determination unit 1200 according to the third embodiment.

The difference between an attribute determination unit 1200 of an object identification apparatus 1000 in the third embodiment and that in the first embodiment will be described with reference to FIG. 1 in the first embodiment. FIG. 11 shows the arrangement of the attribute determination unit 1200 in this embodiment. The attribute determination unit 1200 includes a sex determination unit 1210 and an age group determination unit 1220. In the first embodiment, the attribute determination unit 1200 includes only the sex determination unit 1210. The sex determination unit 1210 determines whether the image input to the attribute determination unit 1200 is a male or female. Likewise, the age group determination unit 1220 determines whether the image input to the attribute determination unit 1200 is an adult or child. In this embodiment, the attribute output from the attribute determination unit 1200 is a combination of two attribute determination results. That is, there are four combinations, namely "male adult", "male child", "female adult", and "female child".

Both the sex determination unit 1210 and the age group determination unit 1220 can use a machine learning method like that disclosed in Neeraj Kumar, 2009, "Attribute and Simile Classifiers for Face Verification", Proc. of Intl. Conference of Computer Vision, which is quoted in the first embodiment. When making the sex determination unit 1210 learn, many face images attached with gender labels are input to the unit to allow to determine a gender boundary. Likewise, when making the age group determination unit 1220 learn, many face images attached with adult/child labels are input to the unit to allow to determine an adult/child boundary.

<Registration/Identification Processing>

A registration procedure and an identification procedure in this embodiment are the same as those described in the first embodiment. Note however that a registered image recording unit 1500 requires feature amount holding units equal in number to the attributes which can be determined by the attribute determination unit 1200. Accordingly, an image registration unit 1400 requires feature amount extraction units respectively corresponding to the attributes which can be determined by the attribute determination unit 1200. Likewise, an image identification unit 1300 requires feature amount extraction units and correlation calculation units.

This embodiment has exemplified an arrangement for a case in which the number of attributes which can be determined is two, namely sex and age. The method described in this embodiment can be applied to a case in which the number of attributes which can be determined is three or more or a case in which attribute determination with two or more determination candidates such as race is to be used. Up to this point, the third embodiment has been described above.

Fourth Embodiment

In the first embodiment, when registering an image, the apparatus presents the user with an attribute determination result on the image to be registered. If the attribute is wrong, the apparatus accepts a correction instruction from the user. The apparatus then records the instruction together with the registered image. In the second embodiment, when registering an image, if the apparatus does not externally obtain a correct attribute of the image to be registered, the apparatus automatically records link information by using the reliability of an attribute determination result. In contrast to them, the fourth embodiment includes both the method of externally accepting a correction instruction and the method of evaluating the reliability of an attribute determination result, and automatically sets link information for a registered image in some cases without any explicit correction instruction.

There may be some person whose face image constantly makes attribute determination processing lead to wrong attribute determination and hence lead to a wrong determination result. In many cases, however, depending on imaging conditions, both correct and wrong determination results may be obtained on even the same person, or unstable person images may be obtained. Face images of even the same person greatly vary due to changes in imaging conditions such as the orientation and expression of the face and illumination. For this reason, attribute determination results may vary due to variations in face image with respect to a person on a boundary in attribute determination, that is, a person A having an androgynous look like that described in the concrete example of the first embodiment. When registering a face image of such a person on which an attribute determination result is unstable, if an attribute determination error occurs, it is possible to add link information to the registered image in accordance with a correction instruction. If, however, attribute determination has succeeded by accident, no correction instruction is issued, and hence no link information is added to the registered image. Identifying the face image of the person without any link information added will lead to inability to identify the registered image of the person and the input image when an attribute determination error has occurred.

In this embodiment, therefore, at the time of registration, the apparatus automatically sets link information for a registered image with respect to a face image on which the reliability of an attribute determination result is low, regardless of whether a correction instruction is issued for the attribute determination result.

<Registration Procedure>

Figure 12:
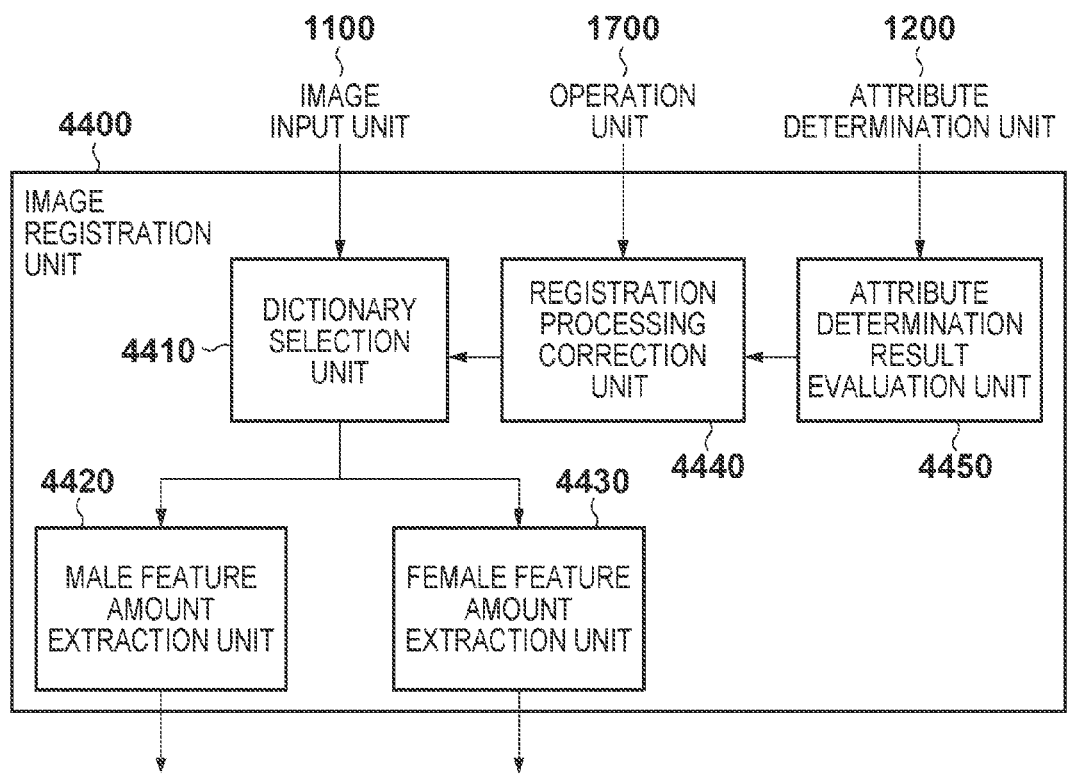
FIG. 12 is a block diagram of an image registration unit 4400 according to the fourth embodiment.

FIG. 12 is a block diagram of an image registration unit 4400 in this embodiment. The image registration unit 4400 includes a dictionary selection unit 4410, a male feature amount extraction unit 4420, a female feature amount extraction unit 4430, a registration processing correction unit 4440, and an attribute determination result evaluation unit 4450.

The dictionary selection unit 4410 has the same function as that of the dictionary selection unit 1410 or dictionary selection unit 2410. The male feature amount extraction unit 4420 has the same function as that of the male feature amount extraction unit 1420 or male feature amount extraction unit 2420. The female feature amount extraction unit 4430 has the same function as that of the female feature amount extraction unit 1430 or female feature amount extraction unit 2430. The registration processing correction unit 4440 has the same function as that of the registration processing correction unit 1440 or registration processing correction unit 2440. The attribute determination result evaluation unit 4450 has the same function as that of the attribute determination result evaluation unit 2450. This embodiment differs from the first and second embodiments in that it can accept a correction instruction for an attribute determination result from an operation unit 1700, and includes the attribute determination result evaluation unit 4450 to evaluate whether an attribute determination result is reliable.

Figure 13:
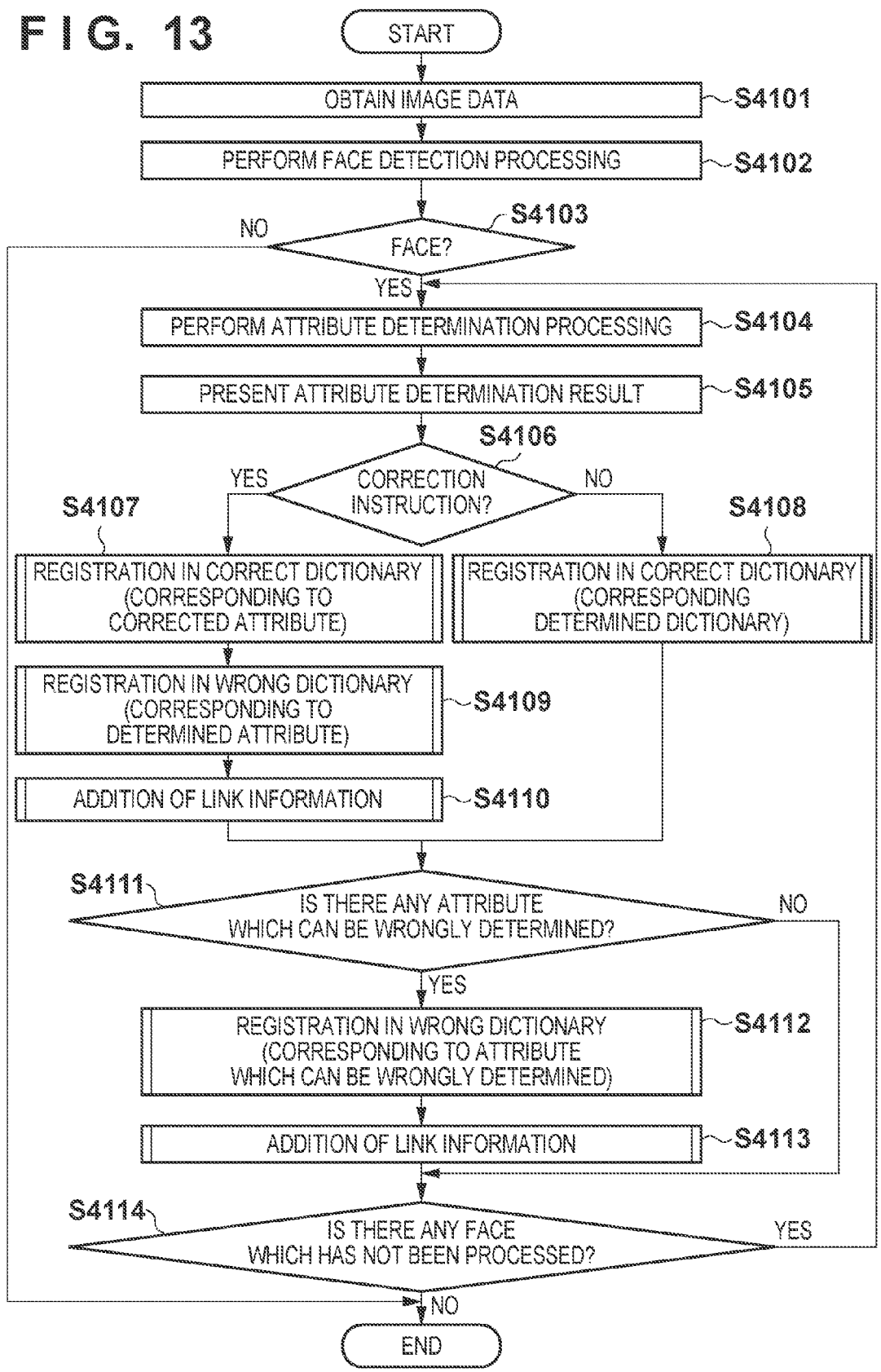
FIG. 13 is a flowchart showing a procedure for registration processing according to the fourth embodiment.

The flowchart of FIG. 13 shows a procedure for registration processing in this embodiment. The processing in each of steps S4101 to S4110 is the same as that in each of steps S1101 to S1110 in FIG. 2, which shows a procedure for registration processing in the first embodiment. The processing in step S4114 is the same as that in step S1111. This procedure differs from that shown in FIG. 2 in that it additionally includes the processing in each of steps S4111, S4112, and S4113.

In step S4111, the image registration unit 4400 determines from an attribute determination result whether there is at least one attribute which can be wrongly determined because of the low reliability of the result. The attribute determination result evaluation method to be used in this case is the same as that in the second embodiment, and hence a description of the method will be omitted. If the image registration unit 4400 determines that there is an attribute which can be wrongly determined (YES in step S4111), the process advances to step S4112. If the image registration unit 4400 determines that there is no attribute which can be wrongly determined (NO in step S4111), the process advances to step S4114.

In step S4112, a registered image recording unit 1500 registers the image in a dictionary corresponding to the attribute which can be wrongly determined.

In step S4113, the registered image recording unit 1500 adds the following link information to the image registered in the dictionary corresponding to the attribute which can be wrongly determined. The contents of the link information are that "the attribute of the person ∘∘ corresponding to this registered image is correctly xx, and the registered image of the person ∘∘ is correctly stored in the dictionary corresponding to the attribute xx".

<Concrete Example of Image Registration Processing>

Image registration processing in this embodiment will be described with reference to the flowchart of FIG. 13. The following is a case in which an image of the person A described in the first embodiment is input as an image to be registered from an image input unit 1100, and an attribute determination unit 1200 has correctly determined that the person is a female. If no correction instruction is obtained (NO in step S4106), first of all, the female feature amount extraction unit 4430 extracts a feature amount from the image to be registered, and stores the feature amount in a female feature amount holding unit 1520 (S4108). Subsequently, the apparatus then checks whether the reliability of the attribute determination result is low so that the person can be wrongly determined as a male. If the person can be wrongly determined as a male (YES in step S4111), the male feature amount extraction unit 4420 extracts a feature amount from the image to be registered and stores the feature amount in a male feature amount holding unit 1510 (S4112). The male feature amount extraction unit 4420 then adds the following link information to the registered image stored in the male feature amount holding unit 1510. The contents of the link information are that "the attribute of the person A corresponding to this registered image is correctly female, and the registered image of the person A is correctly stored in the dictionary corresponding to females" (S4113).

An effect of this embodiment is that it is possible to prevent a deterioration in identification accuracy by correcting an attribute determination result error, at the time of identification, with respect to an image on which the reliability of attribute determination is low, regardless of whether attribute determination processing has accidentally succeeded at the time of registration of the image.

Fifth Embodiment

The fourth embodiment has exemplified the case in which when the reliability of an attribute determination result on an image to be registered is low at the time of image registration, the apparatus automatically adds link information to the image. In contrast to this, in the fifth embodiment, even if a correction instruction is accepted because of an attribute determination result error, when the reliability of the attribute determination result is sufficiently high, the apparatus registers the attribute determination result as a correct attribute. In order to avoid redundancy, a description of the same portions as those in the above embodiments will be omitted. The function of each processing unit described in this embodiment is the same as that of each processing unit described in the above embodiments.

As described in the fourth embodiment, face images whose attributes are wrongly determined in attribute determination processing include face images of persons on which unstable determination results are obtained, that is, sometimes correct results are obtained, and other times wrong results are obtained, depending on imaging conditions, even with respect to the same person. On the other hand, there may be some face image of a person on which a wrong determination result is constantly obtained. This is because, in face authentication accompanying sex determination in this embodiment, there are females with masculine appearances and males with feminine appearances. When registering such a person whose appearance recognized from a face image does not coincide with a correct attribute by using a method corresponding to the correct attribute, the identification accuracy may deteriorate. This is because the male feature amount extraction unit 1420 or the female feature amount extraction unit 1430 described in the first embodiment does not extract "a feature amount suitable for identification among males" or "a feature amount suitable for identification among females". To be more precise, this is because, such a unit extracts "a feature amount suitable for identification among faces with masculine appearances" or "a feature amount suitable for identification among faces with feminine appearances". In some case, therefore, it is more effective to perform registration by a method corresponding to an appearance recognized from a face image, even if the method contradicts the correct attribute. This embodiment therefore regards an attribute as a determination result when the reliability of the attribute determination result is sufficiently high, even if the attribute determination result differs from the correct attribute at the time of registration. In contrast to this, a correct attribute is regarded as an attribute which can be wrongly determined. On that basis, the apparatus performs registration processing. This processing will be described in detail below.

<Registration Procedure>

Figure 14:
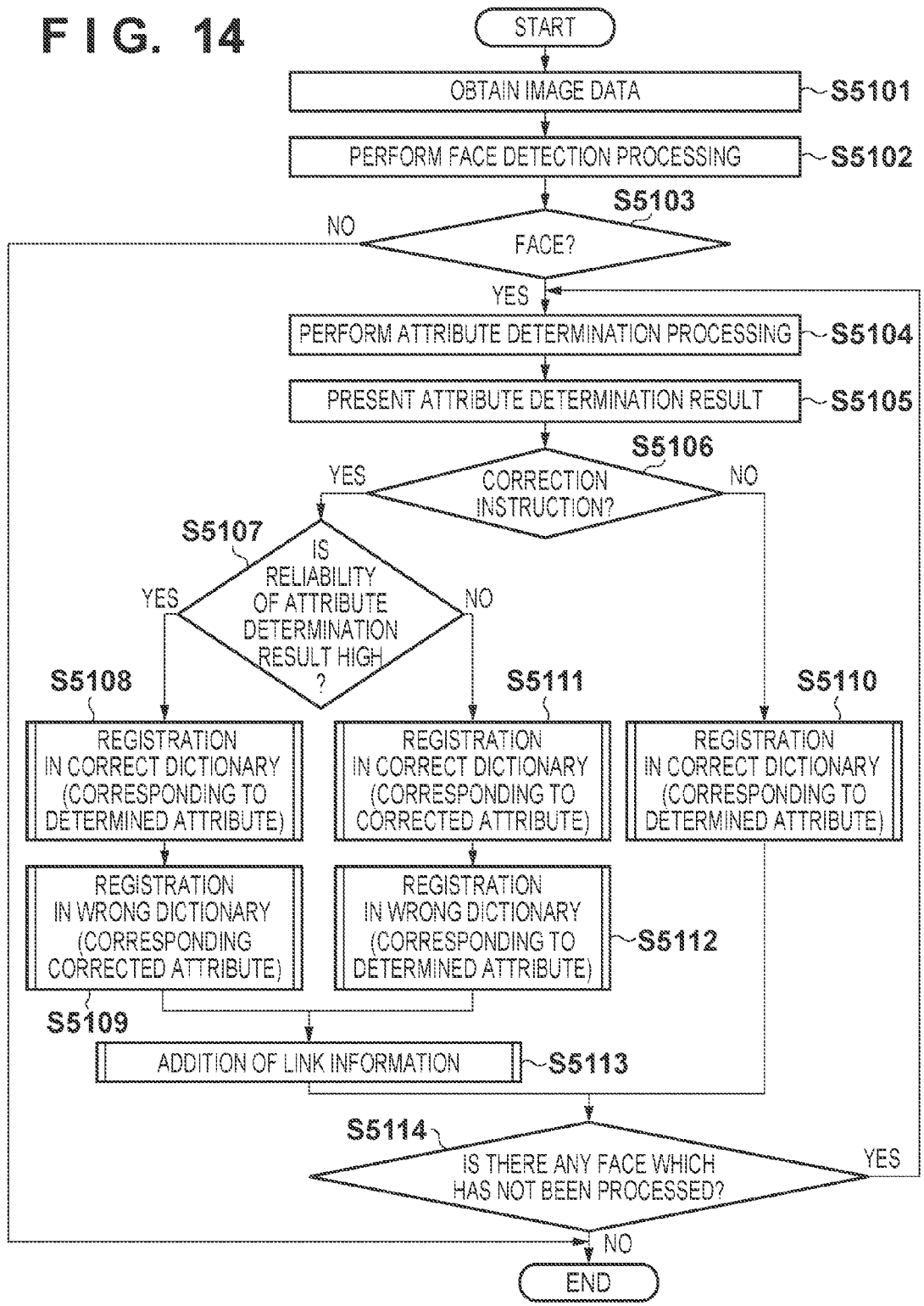
FIG. 14 is a flowchart showing a procedure for registration processing according to the fifth embodiment.

The flowchart of FIG. 14 shows a procedure for registration processing in this embodiment. The processing in each of steps S5101 to S5106 is the same as that in each of steps S1101 to S1106. This procedure differs from that shown in FIG. 2 in the first embodiment in that the processing in each of steps S5107 to S5113 is added after a correction instruction is obtained with respect to an attribute determination result on an image to be registered (YES in step S5106). Note that the processing in step S5110 is the same as that in step S1108, and the processing in step S5114 is the same as that in step S1111.

Different processing will be described below. As in the first embodiment, if an operation unit 1700 determines that it has obtained a correction instruction concerning an attribute determination result on an image to be registered (YES in step S5106), the process advances to step S5107. If the operation unit 1700 determines that it has obtained no correction instruction (NO in step S5106), the process advances to step S5110.

In step S5107, an attribute determination result evaluation unit 2450 evaluates and determines whether the reliability of the attribute determination result is sufficiently high. As a method for this processing, like the method described in the second embodiment, it is preferable to check a numerical value output as an attribute determination result. If the attribute determination result evaluation unit 2450 determines that the reliability is sufficiently high (YES in step S5107), the process advances to step S5108. If the attribute determination result evaluation unit 2450 determines that the reliability is low (NO in step S5107), the process advances to step S5111.

If the attribute determination result evaluation unit 2450 determines that the reliability is sufficiently high (YES in step S5107), the apparatus determines an appearance recognized from the face image does not coincide with a correct attribute, and regards the determined attribute as a correct attribute. In addition, the apparatus regards the correct attribute obtained from the link information as a wrong attribute which can be wrongly determined. The apparatus switches between correct and wrong attributes in this manner. Thereafter, in step S5108, the apparatus registers the image in a dictionary corresponding to the correct attribute (determined attribute). In step S5109, the apparatus also registers the image in a dictionary corresponding to the wrong attribute (the attribute obtained from the link information).

In contrast, if the attribute determination result evaluation unit 2450 determines that the reliability is low (NO in step S5107), the apparatus performs registration processing in the same manner as in the first embodiment. In step S5111, the apparatus registers the image in the correct dictionary corresponding to the corrected attribute. In step S5112, the apparatus also registers the image in the wrong dictionary corresponding to the determined attribute.

In step S5113, the apparatus adds the following link information to the image registered in the dictionary corresponding to the wrong attribute (the attribute obtained from the link information). The contents of the link information are that "the attribute of the person ○○ corresponding to this registered image is correctly xx, and the registered image of the person ○○ is correctly stored in the dictionary corresponding to the attribute xx".

<Concrete Example of Image Registration Processing>

Image registration processing in this embodiment will be described by exemplifying a concrete example in accordance with the flowchart of FIG. 14 with reference to FIG. 12 described in the fourth embodiment. The following is a case in which an image of a female B who looks like a male as an image to be determined is wrongly determined as a male. An image input unit 1100 inputs an image of the female B. An attribute determination unit 1200 wrongly determines the person as a male. If a correction instruction indicating that the person is correctly a female is obtained (YES in step S5106), the apparatus evaluates and determines whether the reliability of the attribute determination result is sufficiently high (S5107). Upon determining that the reliability is sufficiently high (YES in step S5107), the attribute determination unit 1200 regards the correct attribute of the female B as a male. First of all, a male feature amount extraction unit 4420 extracts a feature amount from the image to be registered, and stores the feature amount in a male feature amount holding unit 1510 (S5108). A female feature amount extraction unit 4430 extracts a feature amount from the image to be registered, and stores the feature amount in a female feature amount holding unit 1520 (S5109). The apparatus adds the following link information to the registered image stored in the female feature amount holding unit 1520. The contents of this link information are that "the attribute of the person B corresponding to this registered image is correctly male, and the registered image of the person B is stored in the dictionary corresponding to males" (S5113).

This embodiment is effective when an appearance recognized from a face image does not coincide with a correct attribute. If such an image is forcedly registered by a method corresponding to the correct attribute, the identification accuracy may deteriorate. It is therefore possible to prevent a deterioration in identification accuracy by registering a face image by using a method corresponding to the appearance recognized from the image as long as the reliability of the attribute determination result is sufficiently high.

According to the present invention, it is possible to suppress a deterioration in identification performance even if an attribute determination result, which is a determination result on a characteristic of an object of an image, such as sex or age, differs from a correct answer.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-094377 filed on Apr. 20, 2011, which is hereby incorporated by reference herein in its entirety.

What is claimed is:

1. An information processing apparatus comprising:
an obtaining unit configured to obtain image data;
a detection unit configured to detect an object from the image data;
a class determination unit configured to determine at least one of a plurality of classes into which the detected object may be classified;
a registration unit configured to register the image data in at least one of a plurality of dictionaries respectively corresponding to the plurality of classes based on the determined class, wherein the registration unit registers the image data in respective dictionaries corresponding to at least two classes if it is determined that the image data may be classified into the at least two classes;
a setting unit configured to set, when the image data is registered in not less than two dictionaries, a link between the image data registered in one of the not less than two dictionaries and the image data registered in the other of the not less than two dictionaries; and
an evaluation unit configured to evaluate whether the class determined by said class determination unit is a correct class or a wrong class of the object,
wherein when said evaluation unit evaluates that the class is the wrong class of the object, said registration unit registers the image data corresponding to the correct class as first image data, and said registration unit registers the image data corresponding to the wrong class as second image data, and said setting unit sets a link to the first image data to the second image data.

2. The apparatus according to claim 1, further comprising an acceptance unit configured to accept a correction instruction from a user to the class determined by said class determination unit, wherein said evaluation unit evaluates, in accordance with whether said acceptance unit has accepted the correction instruction, whether the determined class is a correct class of the object.

3. The apparatus according to claim 1, further comprising a calculation unit configured to calculate a reliability for evaluating whether the determined class is the correct class of the object, wherein said evaluation unit evaluates that the determined class is the wrong class of the object, when the reliability of the determined class is lower than a threshold, and evaluates that the determined class is the correct class of the object, when the reliability of the determined class is not less than the threshold.

4. The apparatus according to claim 3, wherein said calculation unit calculates the reliability based on a pixel value of the object.

5. The apparatus according to claim 1, further comprising:
an acceptance unit configured to accept a correction instruction from a user to the class determined by said class determination unit; and
a calculation unit configured to calculate a reliability for evaluating whether the determined class is a correct class of the object,
wherein when said acceptance unit has accepted the correction instruction, and a reliability of the determined class is less than a threshold, said evaluation unit evaluates that the determined class is the wrong class of the object, and evaluates that the class corrected by the correction instruction is the correct class of the object.

6. The apparatus according to claim 5, wherein said calculation unit calculates the reliability based on a pixel value of the object.

7. The apparatus according to claim 5, wherein when said acceptance unit has accepted the correction instruction, and a reliability of the determined class is not less than a threshold, said evaluation unit evaluates that the determined class is the correct class of the object, and evaluates that the class corrected by the correction instruction is the wrong class of the object.

8. The apparatus according to claim 1, further comprising:
a similarity calculation unit configured to calculate a similarity between image data newly obtained by said obtaining unit and each of registered image data included in a dictionary corresponding to a determined class of an object detected from the newly obtained image data by comparing the newly obtained image data with each of the registered image data;
a selection unit configured to select registered image data exhibiting the similarity which is highest; and
a link determination unit configured to determine whether the link is set to the registered image data selected by said selection unit,
wherein when said link determination unit determines that the link is set, said similarity calculation unit further calculates a similarity between registered image data at a link destination and the newly obtained image data.

9. The apparatus according to claim 8, further comprising a threshold determination unit configured to determine whether a similarity between registered image data at the link destination and newly obtained image data, which is calculated by said similarity calculation unit, is not less than a threshold, when said link determination unit determines that the link is set, and determines whether a similarity between the registered image data selected by said selection unit and the newly obtained image data is not less than the threshold, when said link determination unit determines that the link is not set.

10. The apparatus according to claim 9, further comprising an output unit configured to output registered image data for which said threshold determination unit determines that the similarity is not less than the threshold.

11. The apparatus according to claim 8, further comprising a threshold determination unit configured to determine whether at least one of the similarity between the registered image data at the link designation which is calculated by said similarity calculation unit and the newly obtained image data and the similarity between the registered image data selected by said selection unit and the newly obtained image data.

12. The apparatus according to claim 1, wherein the object is a person, and the class includes at least one of sex and age.

13. A method of controlling an information processing apparatus, the method comprising:

obtaining image data;

detecting an object from the image data;

determining at least one of a plurality of classes into which the detected object may be classified;

registering the image data in at least one of a plurality of dictionaries respectively corresponding to the plurality of classes based on the determined class, wherein the registering registers the image data in respective dictionaries corresponding to at least two classes, if it is determined that the image data may be classified into the at least two classes;

setting, when the image data is registered in not less than two dictionaries, a link between the image data registered in one of the not less than two dictionaries and the image data registered in the other of the not less than two dictionaries; and evaluating whether the class determined by said class determination step is a correct class or a wrong class of the object, wherein when said evaluating step evaluates that the class is the wrong class of the object, said registering step registers the image data corresponding to the correct class as first image data, and said registering step registers the image data corresponding to the wrong class as second image data, and said setting step sets a link to the first image data to the second image data.

14. A non-transitory computer-readable storage medium storing a computer program for causing a computer to execute each step in a method of controlling an information processing apparatus defined in claim 13.

* * * * *